(12) United States Patent
Warnock et al.

(10) Patent No.: US 8,015,418 B2
(45) Date of Patent: *Sep. 6, 2011

(54) METHOD AND APPARATUS FOR IMPROVED INFORMATION TRANSACTIONS

(75) Inventors: Christopher M Warnock, Los Altos, CA (US); Richard M Holzgrafe, San Jose, CA (US); Tom J Santos, San Jose, CA (US); Jay C Nolan, Sunnyvale, CA (US)

(73) Assignee: Ebrary, Inc., Palo Alto, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/367,346

(22) Filed: Feb. 6, 2009

(65) Prior Publication Data

US 2009/0187535 A1    Jul. 23, 2009

Related U.S. Application Data

(63) Continuation of application No. 10/306,806, filed on Nov. 27, 2002, now Pat. No. 7,536,561, which is a continuation-in-part of application No. 09/498,944, filed on Feb. 4, 2000.

(60) Provisional application No. 60/159,737, filed on Oct. 15, 1999.

(51) Int. Cl.
    *G06F 11/30* (2006.01)
(52) U.S. Cl. ...................................... 713/193
(58) Field of Classification Search .................. 713/165, 713/166, 193; 380/264, 265, 282, 299; 382/264, 382/265, 282, 299, 256

See application file for complete search history.

(56) References Cited

U.S. PATENT DOCUMENTS

| 5,237,157 A | 8/1993 | Kaplan |
| 5,247,575 A | 9/1993 | Sprague et al. |
| 5,307,452 A * | 4/1994 | Hahn et al. ................. 345/592 |

(Continued)

FOREIGN PATENT DOCUMENTS

EP    0881591 A1    12/1998

(Continued)

OTHER PUBLICATIONS

"jar—The Java Archive Tool" Sun Microsystems as taken from—http://web.archive.org/web/20030418074845/http://java.sun.com/j2se/1.4.2/docs/tooldocs/windows/jar.html (Web archive from Apr. 18, 2003).

(Continued)

*Primary Examiner* — Beemnet W Dada
(74) *Attorney, Agent, or Firm* — Glenn Patent Group; Michael A. Glenn

(57) ABSTRACT

Methods and systems for analyzing an image, such as a newspaper or magazine pager or the like including text by mapping the image to determine regions of text and analyzing portions of the image in accordance with characteristics of selected regions of the text to develop a desired ordering of at least the selected regions in accordance with a textual relationship between the selected regions. The desired order may be related to the order in which the selected regions, and or words therein, are to be presented in a different format appropriate for a specific use, such by a human reader, for transferring the text over a network, for use in a database or by a search function, word processor or printer. Normalizing, columnizing, regionalizing, frameset building and article tracing functions may be used to develop the desired order in related regions in an article within the image.

8 Claims, 34 Drawing Sheets

U.S. PATENT DOCUMENTS

| | | | |
|---|---|---|---|
| 5,444,779 A | 8/1995 | Daniele | |
| 5,465,299 A | 11/1995 | Matsumoto et al. | |
| 5,486,686 A | 1/1996 | Zdybel et al. | |
| 5,532,920 A * | 7/1996 | Hartrick et al. | 715/234 |
| 5,546,528 A | 8/1996 | Johnson | |
| 5,592,549 A | 1/1997 | Nagel et al. | |
| 5,619,247 A | 4/1997 | Russo | |
| 5,625,711 A | 4/1997 | Nicholson | |
| 5,629,980 A | 5/1997 | Stefik et al. | |
| 5,643,064 A | 7/1997 | Grinderslev | |
| 5,673,316 A | 9/1997 | Auerbach et al. | |
| 5,680,479 A | 10/1997 | Wang et al. | |
| 5,696,841 A | 12/1997 | Nakatsuka | |
| 5,701,500 A | 12/1997 | Ikeo et al. | |
| 5,729,637 A | 3/1998 | Nicholson | |
| 5,737,599 A | 4/1998 | Rowe | |
| 5,781,785 A | 7/1998 | Rowe | |
| 5,819,301 A | 10/1998 | Rowe | |
| 5,832,530 A | 11/1998 | Paknad | |
| 5,835,530 A | 11/1998 | Hawkes | |
| 5,848,184 A | 12/1998 | Taylor et al. | |
| 5,860,074 A | 1/1999 | Rowe | |
| 5,892,900 A | 4/1999 | Ginter et al. | |
| 5,930,813 A | 7/1999 | Padgett | |
| 5,933,498 A | 8/1999 | Schneck et al. | |
| 5,949,555 A | 9/1999 | Sakai et al. | |
| 5,991,780 A | 11/1999 | Rivette et al. | |
| 5,999,649 A | 12/1999 | Nicholson | |
| 6,006,240 A | 12/1999 | Handley | |
| 6,012,083 A | 1/2000 | Savitzky et al. | |
| 6,041,316 A | 3/2000 | Allen | |
| 6,049,339 A | 4/2000 | Schiller | |
| 6,119,124 A | 9/2000 | Broder et al. | |
| 6,134,552 A | 10/2000 | Fritz et al. | |
| 6,185,684 B1 | 2/2001 | Pravetz | |
| 6,192,165 B1 | 2/2001 | Irons | |
| 6,205,456 B1 | 3/2001 | Nakao | |
| 6,282,653 B1 | 8/2001 | Berstis et al. | |
| 6,289,450 B1 | 9/2001 | Pensak et al. | |
| 6,327,600 B1 | 12/2001 | Satoh et al. | |
| 6,345,279 B1 | 2/2002 | Li | |
| 6,356,936 B1 | 3/2002 | Donoho | |
| 6,363,376 B1 | 3/2002 | Wiens et al. | |
| 6,385,350 B1 | 5/2002 | Nicholson | |
| 6,389,541 B1 | 5/2002 | Patterson | |
| 6,446,068 B1 | 9/2002 | Kortge | |
| 6,516,337 B1 | 2/2003 | Tripp | |
| 6,523,026 B1 | 2/2003 | Gillis | |
| 6,606,613 B1 | 8/2003 | Altschuler et al. | |
| 6,629,097 B1 | 9/2003 | Keith | |
| 6,640,010 B2 | 10/2003 | Seeger et al. | |
| 6,732,090 B2 | 5/2004 | Shanahan et al. | |
| 6,870,547 B1 | 3/2005 | Crosby et al. | |
| 6,920,610 B1 * | 7/2005 | Lawton et al. | 715/209 |
| 6,988,124 B2 | 1/2006 | Douceur et al. | |
| 7,069,451 B1 | 6/2006 | Ginter et al. | |
| 7,079,278 B2 | 7/2006 | Sato | |
| 7,110,126 B1 | 9/2006 | Lapstun et al. | |
| 7,130,831 B2 | 10/2006 | Howard et al. | |
| 7,133,845 B1 | 11/2006 | Ginter et al. | |
| 7,290,285 B2 | 10/2007 | McCurdy et al. | |
| 7,536,561 B2 | 5/2009 | Warnock et al. | |
| 2002/0042793 A1 | 4/2002 | Choi | |
| 2002/0065857 A1 | 5/2002 | Michalewicz et al. | |
| 2002/0138528 A1 | 9/2002 | Gong et al. | |
| 2002/0143807 A1 | 10/2002 | Komatsu | |
| 2003/0033288 A1 | 2/2003 | Shanahan | |
| 2003/0037094 A1 | 2/2003 | Douceur et al. | |
| 2003/0037181 A1 | 2/2003 | Freed | |
| 2003/0061200 A1 | 3/2003 | Hubert | |
| 2003/0185448 A1 | 10/2003 | Seeger et al. | |
| 2004/0030680 A1 | 2/2004 | Veit | |
| 2004/0133544 A1 | 7/2004 | Klessig | |
| 2004/0133545 A1 | 7/2004 | Klessig | |
| 2004/0133588 A1 | 7/2004 | Klessig | |
| 2004/0133589 A1 | 7/2004 | Klessig | |
| 2004/0205448 A1 | 10/2004 | Grefenstette | |
| 2004/0239681 A1 | 12/2004 | Robotham et al. | |
| 2005/0022114 A1 | 1/2005 | Shanahan | |
| 2005/0044487 A1 | 2/2005 | Bellegarda et al. | |

FOREIGN PATENT DOCUMENTS

| | | |
|---|---|---|
| EP | 0881592 A2 | 12/1998 |
| EP | 0881592 B2 | 10/2002 |
| EP | 1284461 A1 | 2/2003 |
| EP | 0881591 B1 | 9/2003 |
| JP | 2001175807 | 6/2001 |
| WO | WO 96/27155 | 9/1996 |
| WO | WO 98/42098 | 9/1998 |
| WO | WO 99/05618 | 4/1999 |
| WO | WO 99/39286 | 5/1999 |
| WO | WO 01/20596 A1 | 3/2001 |
| WO | WO 01/57711 A1 | 9/2001 |
| WO | WO 02/41170 A2 | 5/2002 |
| WO | WO 02/41170 A3 | 5/2002 |
| WO | WO 2004/051555 A2 | 6/2004 |
| WO | WO 2005/062192 A1 | 7/2005 |

OTHER PUBLICATIONS

Cattoni, et al; "Geometric Layout Analysis Techniques for Document Image Understanding," Jan. 1998, Review, ITC-IRST Technical Report #9703-09, pp. 1-68, XP002229195, Trento, Italy.

Figa, E., et al., "Lexical Inference Mechanisms for Text Understanding and Classification," 2003, Proceedings of the 66th ASIST Annual Meeting, Humanizing Information Technology: From Ideas to Bits and Back, ASIST 2003, Information Today, Inc., pp. 165-173, Medford, NJ, USA.

Parodi, P., et al., "Efficient and Flexible Text Extraction from Document Pages," Dec. 1999, International Journal on Document Analysis and Recognition, vol. 2, No. 2-3, pp. 67-79, Springer-Verlag, Germany.

Yan-Min Chen, et al., "Multi-Document Summarization Based on Lexical Chains," 2005, Proceedings of 2005 International Conference on Machine Learning and Cybernetics, IEEE, Piscataway, NJ, USA.

Guoren Wang, et al., "Design and Implementation of a Semantic Document Management System," Jan. 2005, Information Technology Journal, vol. 4, No. 1, pp. 21-31, Pakistan.

Mouri, T., et al., "Extracting New Topic Contents from Hidden Web Sites," 2004, Proceedings ITCC 2004, International Conference on Information Technology: Coding and Computing, IEEE Comput. Soc., vol. 1, pp. 314-319, Los Alamitos, CA, USA.

Srihari, S.N., et al., "Forensic Handwritten Document Retrieval System," 2004, Proceedings First Workshop on Document Image Analysis for Libraries, IEEE Comput. Soc, pp. 188-194, Los Alamitos, CA, USA.

Estievenart, F., et al., "A Tool-Supported Method to Extract Data and Schema from Web Sites," 2003, Proceedings Fifth IEEE International Workshop on Web Site Evolution Theme, Architecture, IEEE Comput. Soc, pp. 3-11, Los Alamitos, CA, USA.

Chuan-Jie Lin, et al., "Description of Preliminary Results to TREC-8 QA Task," 2000, Information Technology: Eighth Text Retrieval Conference (TREC-8) (NIST SP 500-246), pp. 507-512, NIST, Gaithersburg, MD, USA.

Embley, D.W., et al., "Conceptual-Model-Based Data Extraction from Multiple-Record Web Pages," Nov. 1999, Data & Knowledge Engineering, vol. 31, No. 3, pp. 227-251, Elsevier, Netherlands.

Embley, D.W., et al., "A Conceptual-Modeling Approach to Extracting Data from the Web," 1998, Conceptual Modeling—ER'98, 17th International Conference on Conceptual Modeling, Proceedings pp. 78-91, Springer-Verlag, Berlin, Germany.

Knoll, A., et al., "An Integrated Approach to Semantic Evaluation and Content-Based Retrieval of Multimedia Documents," 1998, Research and Advanced Technology for Digital Libraries, Second European Conference, ECDL'98, Proceedings pp. 409-428, Springer-Verlag, Berlin, Germany.

Fujisawa, H., et al., "Automatically Organizing Document Bases Using Document Understanding Techniques," 1992, Future Databases, Proceedings of the Second Far-East Workshop on Future Database Systems, pp. 244-253, World Scientific, Singapore.

Keshi, I. et al., "A Knowledge-Based Framework in an Intelligent Assistant System for Making Documents," Aug. 1989, Future Generation Computer Systems, vol. 5, No. 1, pp. 51-58, Netherlands.

Bartal, "Probabilistic Approximation of Metric Spaces and Its Algorithmic Applications," 1996, In: FOCS Proceedings of the 37th Annual Symposium on Foundations of Computer Science. Washington DC, IEEE, Abstract, pp. 2-3, ISSN 0272-5428.

Zhang, et al., "BIRCH: An Efficient Data Clustering Method for Very Large Databases," 1996, In: ACM Sigmod Record, Proceedings of the 1996 ACM SIGMOD International Conference on Management of Data, New York: ACM Press, vol. 25, Issue 2, pp. 103-114, ISSN 0163-5808.

Song, W. et al.; "A semantic similarity approach to electronic document modeling and integration"; Jne 2000, Proc. of the 1st Int'l Web Information Systems Engineering Conference on Hong Kong, Los Alamitos, CA, pp. 116-124.

Mani I Ed et al.; "Recent developments in text summarization"; Nov. 5, 2001; proc. of the 2001 ACM CIKM10th Int'l Conf. on Information and Knowledge Management; Atlanta, GA, pp. 529-531.

Carchiolo, V. et al.; "Improving WEB usability by categorizing information"; Oct. 2003; Proc. Int'l Conf. on Web Intelligence; Piscataway, NJ, pp. 146-152.

European Search Report mailed Aug. 20, 2010 for related European patent application No. EP06748238, 7 pages.

Chen, Liren, et al.; "WebMate: a personal agent for browsing and searching"; 1998; Proc. of the 2nd Int'l Conf. on Autonomous Agents; pp. 132-139.

Zamir, Oren et al.; "Grouper: a dynamic clustering interface to Web search results"; 1999; Proc. of the 2nd Int'l Conf. on World Wide Web; Toronto, Canada, pp. 1361-1374.

* cited by examiner

Bermuda

Toomas Gross

B is a British overseas territory the North Atlantic Ocean. Located off the east coast of the United States, it is situated around 1770 km 1,100 miles northeast of Miami, Florida and 1350 km 840 miles south of Halifax, Nova Scotia. The nearest landmass is Cape Hatteras, North Economic developments It is the oldest and most populous remaining British overseas territory, settled by England a century before the Acts of Union that created the Kingdom of Great Britain. It is the oldest and most

*FIG. 11*

Bermuda

Toomas Gross

B is a British overseas territory the North Atlantic Ocean. Located off the east coast of the United States, it is situated around 1770 km 1,100 miles northeast of Miami, Florida and 1350 km 840 miles south of Halifax, Nova Scotia. The nearest landmass is Cape Hatteras, North Economic developments It is the oldest and most populous remaining British overseas territory, settled by England a century before the Acts of Union that created the Kingdom of Great Britain. It is the oldest and most

*FIG. 12*

Bermuda

Toomas Gross

B is a British overseas territory the North Atlantic Ocean. Located off the east coast of the United States, it is situated around 1770 km 1,100 miles northeast of Miami, Florida and 1350 km 840 miles south of Halifax, Nova Scotia. The nearest landmass is Cape Hatteras, North Economic developments It is the oldest and most populous remaining British overseas territory, settled by England a century before the Acts of Union that created the Kingdom of Great Britain. It is the oldest and most

*FIG. 17A*

Bermuda

Toomas Gross

B is a British overseas territory the North Atlantic Ocean. Located off the east coast of the United States, it is situated around 1770 km 1,100 miles northeast of Miami, Florida and 1350 km 840 miles south of Halifax, Nova Scotia. The nearest landmass is Cape Hatteras, North Economic developments It is the oldest and most populous remaining British overseas territory, settled by England a century before the Acts of Union that created the Kingdom of Great Britain. It is the oldest and most

*FIG. 17B*

| | |
|---|---|
| 1.1 | Bermuda |
| 2.1 | Toomas Gross |
| 3.1 | B is a British overseas territory the North Atlantic Ocean. Located off the east coast of the United States, it is situated around 1770 km 1,100 miles northeast of Miami, Florida and 1350 km 840 miles south of Halifax, Nova Scotia. The nearest landmass is Cape Hatteras, North | Economic developments<br><br>It is the oldest and most populous remaining British overseas territory, settled by England a century before the Acts of Union that created the Kingdom of Great Britain. It is the oldest and most | 3.2 |

*FIG. 18D*

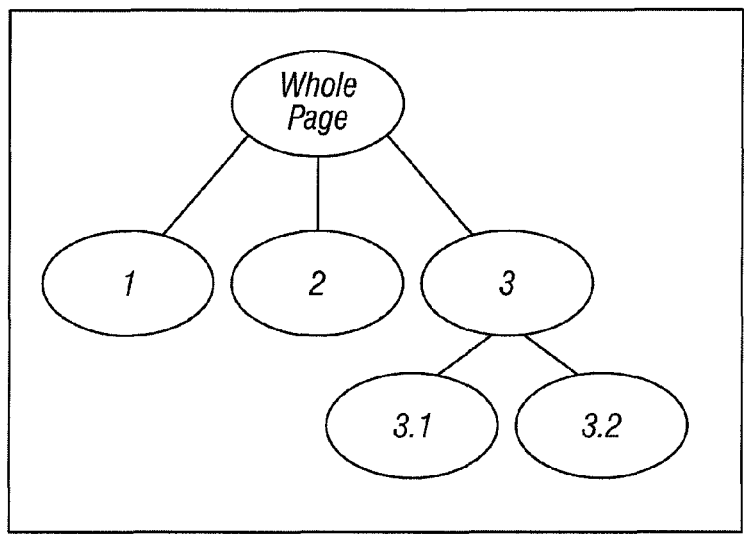

*FIG. 19*

Many return for jobs with tribe

Tribal officials increase about 20 percent with the opening last Thursday of the new Diamond-Noga Highway casino & hot Despite the windfall, local tribes have fallen short of mandates that they use gaming revenues to become more self sufficient, develop their economies and build stronger governments, a investigation found. The Tohono O'odham Nation's per capita federal spending, when adjusted turning to gangs to fill their free time. The tribe invested $30 million nearly two years ago to build five youth centers to Cover young people an story native to gangs, but there's no telling yet whether they've made a difference.
Gangs lure kids away from school. Dropout rates at the tribe's Baboquivari High School are spiraling — up to 26 percent in 2005-06 from just under 16 percent five earlier — cutting into the pool of applicants

*FIG. 20B*

Many return for jobs with tribe

Tribal officials increase about 20 percent with the opening last Thursday of the new Diamond-Noga Highway casino & hot Despite the windfall, local tribes have fallen short of mandates that they use gaming revenues to become more self sufficient, develop their economies and build stronger governments, a investigation found. The Tohono O'odham Nation's per capita federal spending, when adjusted turning to gangs to fill their free time. The tribe invested $30 million nearly two years ago to build five youth centers to young people an native to gangs, but there's no telling yet whether they've made a difference. Gangs lure kids away from school. Dropout rates at the tribe's Baboquivari High School are spiraling — up to 26 percent in 2005-06 from just under 16 percent five earlier — cutting into the pool of applicants

Cover story

*FIG. 21*

Login Dialog

Copy Authorization Dialog

*Standard Print Dialog*

*Print Authorization Dialog*

InfoTools Window

Search Document Dialog

Search Ebrary Dialog

InfoTools Menu

METHOD AND APPARATUS FOR IMPROVED INFORMATION TRANSACTIONS

CROSS REFERENCE TO RELATED APPLICATIONS

This application is a continuation of U.S. patent application Ser. No. 10/306,806 filed 27 Nov. 2002, now U.S. Pat. No. 7,536,561, which is a continuation-in-part of U.S. patent application Ser. No. 09/498,944 filed Feb. 4, 2000, which claims benefit of U.S. provisional patent application Ser. No. 60/159,737 filed Oct. 15, 1999, all of which are incorporated herein in their entirety by this reference thereto.

FIELD OF THE INVENTION

Methods and systems are disclosed for identifying and properly ordering portions of text from a complex textual format such as a newspaper or magazine page in order to provide access to that information in an appropriate format for transmission, for example, over a public data network with access control and paid transactions.

BACKGROUND OF THE INVENTION

At the present time, many people are familiar with accessing information over a data network. For purposes of this discussion, it is helpful to consider two categories of network. Free or public data networks are networks, such as the Internet, where access to the network and to information publicly posted on the network is provided free of charge and generally free of subscription identifiers or login. In contrast to free networks, for purposes of this discussion, are subscription or paid information services or networks. In subscription networks, users typically pay some type of periodic usage fee and may also pay for access to particular services or databases. Subscription networks include networks or data systems designed for the public at large, such as AOL™, CompuServe™, or Prodigy™. Subscription networks also include networks or data systems designed for particular professions or interest areas, such as Lexis™ and Westlaw™ in the legal field, Nexis™ for news stories, or Dialog™ for a range of documents including patents, technical publications, and business publications. Some paid information services allow limited searching and viewing of documents for free or after paying a subscription fee, but full access to documents, either for viewing, printing, or downloading, generally requires a fee. In many instances, the fee is a per document or per record charge, though systems have existed that included a per page or per line charge for performing certain actions, such as printing.

It should be understood that paid and free categories are not rigid, and both free and paid services can include some characteristics of the other.

A problem not yet fully addressed, particularly on free networks, is how to compensate copyright owners or information assemblers for access to information or documents that are placed on the free network, while allowing users meaningful access to the data.

A number of prior systems for allowing paid access to information have been developed, but each of these has had shortcomings, as discussed below. One large document database that is accessible for free over the Internet is the IBM Intellectual Property Network, currently available at http://www.patents.ibm.com/. This service allow free searching in a number of patent databases and allows users, for free, to view a textual representation (generally in HTML format) of the front page of patents and in some case patent claims for free. A user can also view a graphical image of each patent page in a graphical format (generally TIFF) for free and can print or download the graphical scan of the page. However, this graphical format provides reduced usability for the user, because bitmapped text in the TIFF file cannot be searched or selected. File sizes are generally also large and therefore slow to download. Text also cannot be copied from the graphical format. If a user wishes access to the full text of a patent in a text file format, the user pays a fee to download a version of the document. Various file formats, such as PDF, HTML, or TIFF are available for download, but accessing any of these formats requires paying a per-document fee. The service provides very limited paid access to portions of documents. For example, in one option, the user can download the front pages of up to six patents for a single fee. The service does not allow users to print or copy directly from a document at a different cost structure, but has just one paid access, file download. Once a file is downloaded, it is freely and repeatedly viewable or printable by the user and, so far as the software is concerned, it can be freely distributed and copied.

Services that require an initial or ongoing subscription fee are unattractive to consumers who may be one time or very occasional users of the database. Subscription services can, at times, be unattractive to information providers, because requiring subscriptions can reduce service utilization and revenues. Subscription services are, at times, unattractive to creators and publishers because it can be difficult to fairly compensate a particular document creator when a database may contain thousands of documents by thousands of different creators. Services that allow free access to a document after it is downloaded may be unattractive to publishers because once high-quality electronic content is made available, there is no technical restriction on a user from electronically republishing the content.

A number of different document formats are presently available that allow additional information, security features, or computer code to be included in a text/graphic document. The Microsoft Word™ doc document format, for example, can include macros, bookmark and cross-reference information, revision history information, two-password password protection, etc.

The Adobe Acrobat Portable Document Format (PDF), and the PostScript™ layout language on which it is based, also provide mechanisms for including various procedures related to encryption and security. Adobe has also released some technology for managing and distributing secured documents using PDF. Adobe® PDF Merchant™ is server-based software that enables eBook and content providers to sell and distribute documents electronically with security. It is designed to integrate into existing eCommerce and transaction servers, making it easy for publishers, distributors, and retailers to encrypt volumes of Adobe Portable Document Format (PDF) files and sell them over the Web and provides mechanisms for Managing the distribution of electronic keys. Content owners can specify standard Acrobat permissions, including privileges for printing, changing the document, selecting text and graphics, and adding or changing annotations and form fields. Further information is available from http://www.adobe.com/products/pdfmerchant/main.html.

There exist some examples of easily accessible information tools such as definition and thesaurus look-ups. The NeXT operating system, for example, allowed users to click on words and thereby access definitions from a Merriam-Webster® dictionary. Guru-NET is a recent service using similar techniques to provide additional information to users based on indicated text. Many of these systems, such as Guru-NET, for example, fail when attempting to provide information tools access in encoded documents, such as PDF. These systems are not incorporated with systems for paid document access.

What is needed is an information accessing and distribution service that can allow users meaningful access to electronic data or information with a pricing arrangement attractive to both users of the system and information publishers or providers.

SUMMARY OF THE INVENTION

Methods and/or systems are disclosed for distribution of information (including any digital data) on a network. Various embodiments and aspects of the methods and systems disclosed operate to give users meaningful access to the information while allowing information owners or distributors to receive fair compensation.

In the present discussion, information available over a public network will be referred as contained in documents. It should be understood that the terms information or document refer to any type of digitally-encoded data that can be presented or transmitted by a computer or other digital device including, but not limited to, text, graphics, photos, executable files, data tables, audio, video, three dimensional data, or multimedia data that is a combination of any of these.

In a further embodiment, the disclosed method allows a user to review a document while connected to a network, but prevents the user from downloading, printing, or copying the document without receiving an additional authorization or transaction.

In a further embodiment, the disclosed method allows a user to review documents at a first cost basis (which in a preferred embodiment will be free, while in other embodiments some type of cost may be involved), while providing other access to documents, such as copying, printing, or downloading, on a second cost basis.

In a further embodiment, the disclosed method allows a user to access a user selectable portion of a document at a price based on the amount of access selected to a fine granularity. Material selected can include a user-selectable portion of a document, down to a word for copying, an entire document, or an anthology of components of multiple documents. Different actions may be allowed on different portions of documents, for example, a publisher may allow a user to print an entire document, but may only electronically allow a user to copy a limited portion of a document.

In a further embodiment, the disclosed system allows access to documents for viewing at no cost or a reduced cost and that requires a per action fee each time other actions are desired on a document. In contrast to prior art systems, even after a first printing of a document, the method continues to maintain protection for the information contained in the document and to restrict access as a publisher specifies.

In a further embodiment, the disclosed method provides tracking and compensating creators of material when that material is accessible from a document database and in a further embodiment when that material is incorporated into a document that may contain material created by others and for which others are compensated.

In a still further embodiment, the disclosed methods and systems provide techniques for identifying and ordering text from a complicated format such as a newspaper or magazine page to be identified and ordered in a useful manner for distribution and use.

In accordance with a first aspect, the disclosed methods and systems provide for a secure transfer of an image over a network from server to client by selectively transferring from a server to a client a low resolution version of an image from a document stored in a data repository, mapping the image to determine a mapping template related to portions of the image and determining from the mapping template one or more portions of the image selected by action of a user at the client; and transferring the selected portions of the image from the server to the client.

In other aspects, the method may include determining a preferred order of the words in the selected portions, transferring words in the selected portions in the preferred order, utilization of a preferred order for interpretation by a human, one or more of the following functions, columnizing or regionizing, the additional use of a normalizing function, and/or transferring the selected portions to the client only if the client meets one or more authorization requirements.

A further understanding of the methods and systems disclosed can be had from the detailed discussion of specific embodiments below. For purposes of clarity, this discussion refers to devices, methods, and concepts in terms of specific examples. However, the methods and systems disclosed may operate in a wide variety of applications. It is therefore intended that the scope of the disclosed inventions not be limited except as provided in the attached claims.

Furthermore, it is well known in the art that computer systems can include a wide variety d different components and different functions in a modular fashion. Different embodiments of the disclosed methods and systems can include different mixtures of elements and functions and may group various functions as parts of various elements. For purposes of clarity, the disclosed methods and systems are is described in terms of techniques that include different innovative components and innovative combinations of components.

Furthermore, it is well known in the art of internet applications and software systems that particular file formats, languages, and underlying methods of operation may vary. The disclosure of a particular implementation language or format of an element should not be taken to limit the inventions in the disclosed methods and systems to particular implementations except as provided in the attached claims.

All publications, patents, and patent applications cited herein are hereby incorporated by reference in their entirety for all purposes. The disclosed methods and systems will be better understood with reference to the following drawings and detailed description.

BRIEF DESCRIPTION OF THE DRAWINGS

FIG. 11 illustrates the non-intuitive text selection resulting from selection of text in a image having a multi-column layout of the text.

FIG. 12 illustrates the improved text selection resulting from use of the mapping optimization function shown in FIG. 10 when used with the image having a multi-column layout of the text of FIG. 11.

FIG. 19 illustrates the completion of the operations performed by the columnizer function and the ordering of regions inherent in the internal tree structure.

FIG. 21 illustrates the desired result of the operation of the regionizer on the example shown in FIG. 20.

DESCRIPTION OF SPECIFIC EMBODIMENTS

Methods of Operation

Providing Secure Access to a Document

Figure 1:
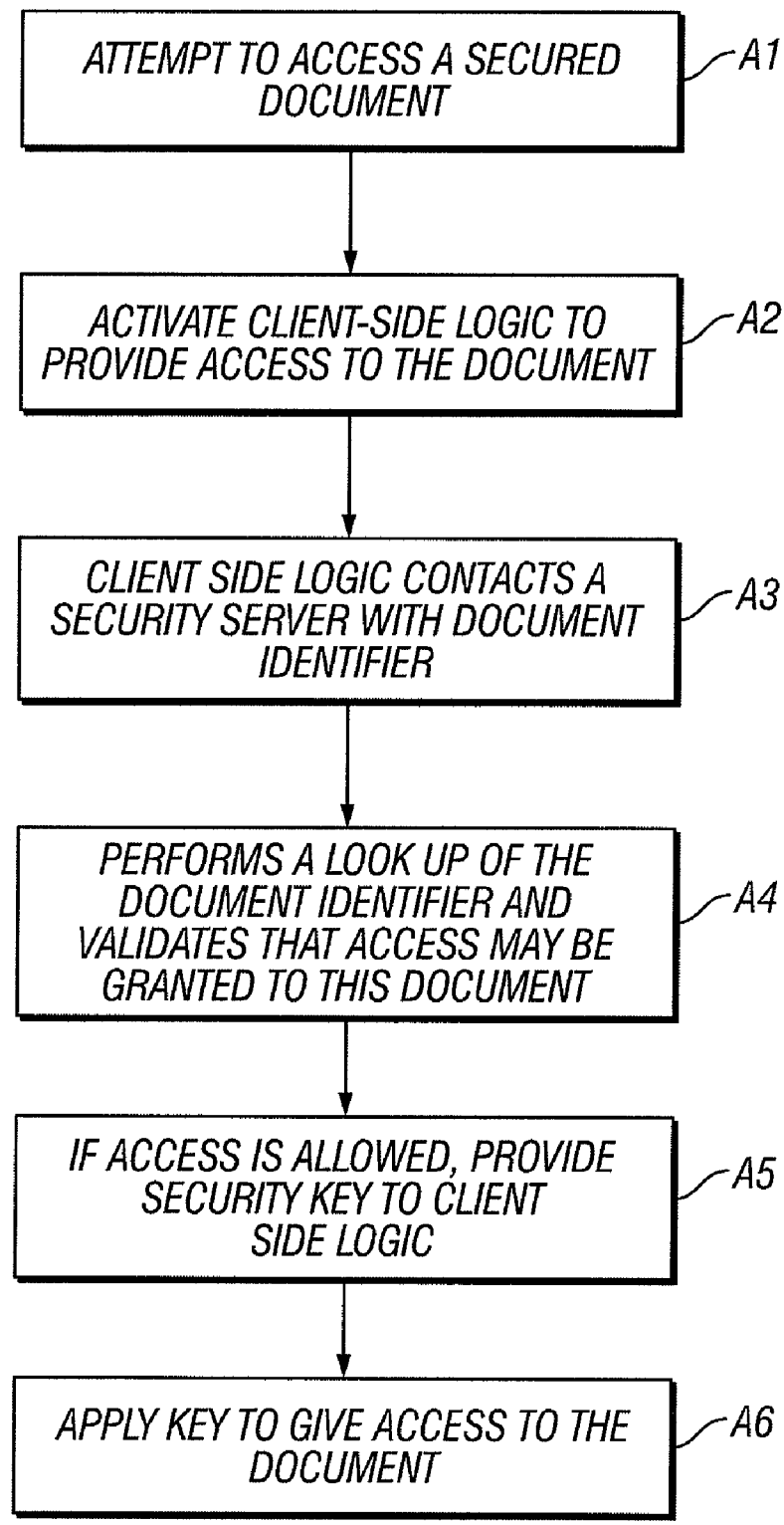
FIG. 1 is a flow chart illustrating a method for providing secure access to a document according to a specific embodiment of the methods and systems disclosed.

FIG. 1 is a flow chart illustrating a method for providing secure access to a document according to a specific embodiment of the methods and systems disclosed.

According to this embodiment, when a user first attempts to access a secured document according to the disclosed methods and systems (Step A1), client-side logic is activated to provide access to the document (Step A2). Without this client-side logic, the user cannot access the document because of the security features in the document. The client side logic then contacts a security server with a document identifier derived from the document (Step A3). The security server performs a look up of the document identifier and validates that access may be granted to this document (Step A4) based on the document identification and possibly other factors (such as, but not limited to, any combination of a user's identification, presence of a valid and active charging account, a user's network address, a user's age verification, etc.). If validation is indicated, the security server transmits back to client side logic a security key that may be used to access the document (Step A5). If validated, the client-side logic then applies the key to give access to the document (Step A6).

Application of the security key to "unlock" the document can be performed in a variety of ways. In one embodiment, the majority of data in the document (other than the document id and possibly other citation or abstract data) is encrypted using a standard encryption scheme, such as PGP. Each document has its own key, which is kept at the security server indexed by document identification. The security key and request for the security key that pass between the client-side logic and the security server may be further encrypted using a secure data channel via public-key encryption or other encryption methods) so that the key can only be decoded and applied by the client-side logic requesting it.

According to one embodiment of the disclosed methods and systems, a security feature enables documents to be freely browsed from a network location but does not allow documents to be copied or downloaded in any meaningful way because the file is encrypted and cannot be accessed without the client-side logic of the methods and systems disclosed. In a further embodiment, the disclosed methods and systems do not allow downloading of documents from the server, only serving of portions to be viewed from the documents. In this embodiment, the client-side logic will only allow decrypting the document as the document is currently being served from the server. Once the client-side logic is used to access the methods and systems disclosed, the logic restricts the types of actions that can be performed on the document and ensures that the specified fee is paid before allowing certain transactions.

In one specific embodiment, in order to access any secured document, the client side logic must be able to communicate with a security server before the logic allows access to the document. The security server provides the security key allowing access to the document.

In various embodiments, the client-side logic may be incorporated into a plug-in that operates cooperatively with a browser or viewer. As understood in the art, the plug-in will then be available when the browser is running.

In another embodiment, the client-side logic may be installed as an independent service under the operating system as system routines or an independent application. In this embodiment, access and security features may be provided for files accessed outside of a browser and accessed locally.

In an alternative further embodiment, a user cannot save a secured document. This prevents modified or insecure copies from being created and distributed.

It will be seen that in one embodiment of the method just described, in general terms, access to documents is restricted on a per use and a per action basis. Even if a document is allowed to be downloaded to a local system, each attempt to perform an action on a document will require activation of the security logic and may require a security key. Thus, even where information is allowed to be downloaded to a system and freely viewed, other actions such as copying, printing, may be restricted or may be allowed only after payment of the required fee each time the action is requested.

As a first aspect; access methods and systems disclosed may detect and interrupt copying, printing or other actions on a document if that document was formatted according to the invention. The disclosed methods and systems may necessarily and successfully used its security features to open the document. If so, the methods and systems disclosed may remember and keep this knowledge. When the document is closed, the disclosed methods and systems may determine this and deletes the record.

Once it is determined that a document is one constructed for predefined restricted actions, the disclosed methods and systems may interrupt standard handling and substitutes or inserts custom handling. Control is passed to the default handler if a document is not one created in accordance with the disclosed methods and systems.

Requesting a Paid Action

Figure 2:
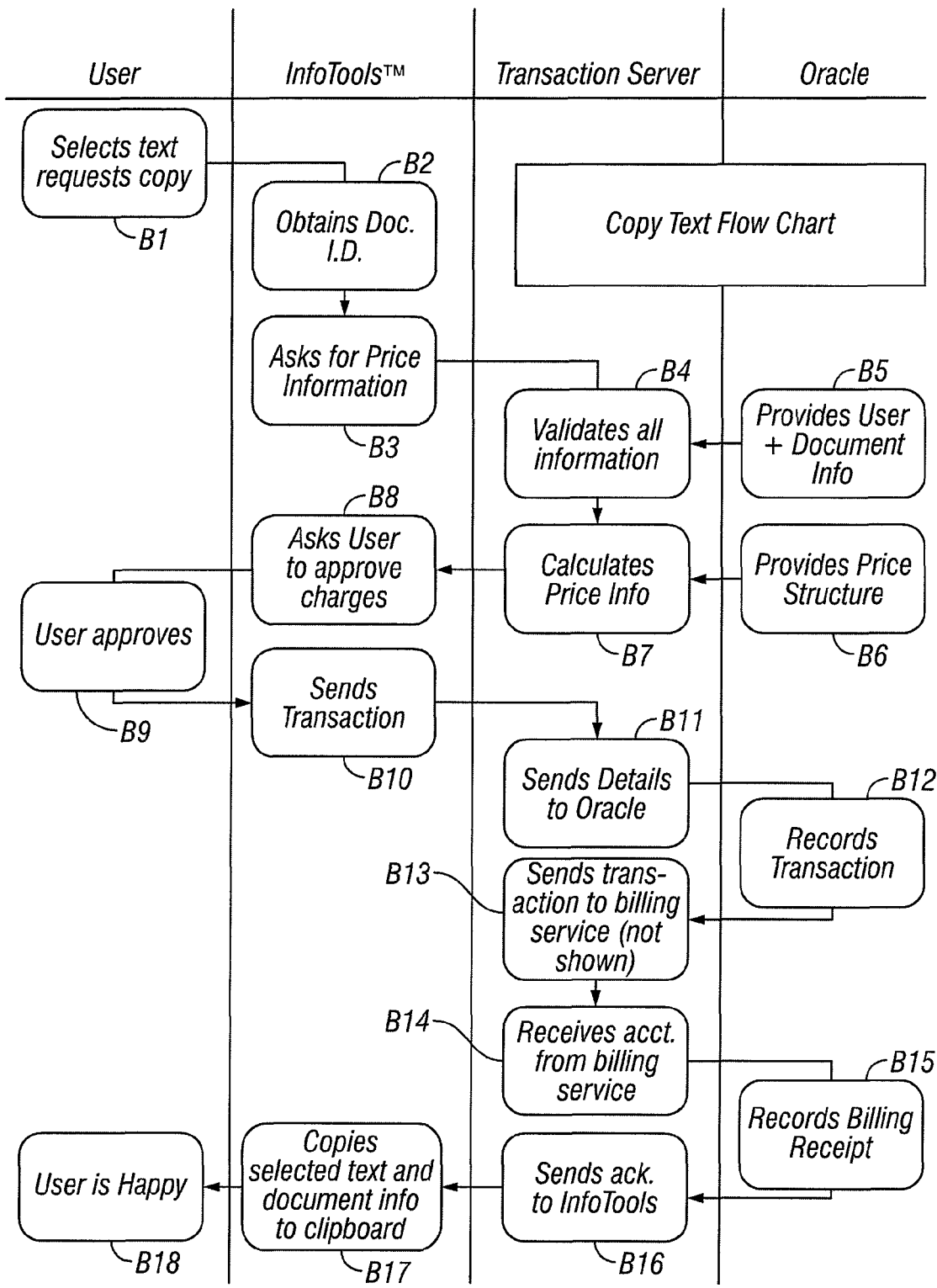
FIG. 2 is a flow chart illustrating a method for allowing a paid action according to an embodiment of the methods and systems disclosed.

FIG. 2 is a flow chart illustrating a method for allowing a paid. In this example, the method shown is for access of text information to request to copy a portion of information. However, accessing information for any other type of action (such as printing, downloading, playing, etc.) may be performed by the same general method.

FIG. 2 shows the method in the context of a particular system embodiment, with specific functions performed by four different system participants: a user, a logic module installed on the user's computer (herein at times referred to as InfoTools™ and also understood as client-side logic), a transaction server, and a database server (typically an advanced SQL-type database system.) While the method and other methods described herein may be described in a specific sequence with specific participants performing specific functions, these descriptions should be understood as examples; and variations in accordance with the general methods described in the attached claims are possible.

As shown, this specific embodiment of the methods and systems disclosed commences when a user requests a desired action for an indicated portion of information (Step B1). Requesting an action can take place in a variety of ways as known in the art, but as discussed elsewhere herein, in a preferred embodiment, a user will request a specific action in way with which they are familiar from other applications. For example, in a specific embodiment, a copy action may be requested by using a Control-C or Command-C keystroke (depending on computer platform), a right-click menu, or a menu-bar selection, all as commonly known in the art. Upon detecting a requested action, the client-side logic obtains an identifier for the selected information (Step B2). An identifier for the selected information consists of an identifier for the document plus an identifier for the selected range of text or data within the document (in one embodiment, the latter is the range of pages on which the selection is found). The document identifier is a value invisibly embedded in the document and/or derived from the URL by which the document was obtained from the server.

The client-side logic composes a request for pricing information and transmits that request to a transaction server (Step B3). The transaction server validates the information in the request (Step B4) and receives from a database, user and document information (Step B5). The database also provides price structure (Step B6) and the transaction server calculates price information and transmits that information back to the client side logic (Step B7).

The client-side logic determines if the pricing is approved by the user (Step B8), either by displaying a request for approval to a user or by reference to user setup data. Upon determining user approval (Step B9), the client-side logic sends the transaction to the transaction server (Step B10) which forwards the details (Step B11) to be recorded in the database (Step B12). The transaction server may also send the transaction to a credit card or electronic cash service to complete transfer of funds (Step B13) and receives account information from that service (Step B14), which is also recorded in the database (Step B15). With transaction payment successfully verified, an acknowledgement is sent back to the client side logic (Step B16) which allows the access the user has requested (in a specific embodiment including copying and formatting the selected text and document info such as citation data to the clipboard) (Step B17) to satisfy the user (Step B18).

According to a specific embodiment, document identification and range identification may be specifically provided or, where these features are available in a standard viewer, the disclosed methods and systems may use features from the standard viewer.

Furthermore, for some document formats the process of determining the range for selected text for purposes of performing an action, such as copying, will involve an algorithm that is part of the logic of the disclosed methods and systems that will iterate over each rectangle of the selected text that describes physical location (on a printed or displayed page of text) of each word or portion of a word in the selected text, and from those locations determining the range desired.

Alternative Method for Requesting a Paid Action

This section discusses a simplified alternative method for performing an action (in this case, the example action is printing). It should be understood that this and the previously described example method can be adapted to a variety of different paid actions, such as, but not limited to, printing, copying, executing, playing, etc.

As in the discussion above, in this example, printing also requires a transaction indication, in this case a user requests a certain number of pages to be printed. In specific embodiments, the disclosed methods and systems may generate the cost of printing the page or text ranges based upon the number of pages in a book, the cost of a book, the number of pages being printed, the number of off-line copies being made or other algorithms which can be specified by the content provider.

As shown, this specific embodiment commences when a user indicates an action for an indicated portion of information (Step C1). An action options dialog (in a specific embodiment one that is standard for the platform) appears (Step C2) and the user indicates the desired options (Step C3). Another dialog appears (Step C4) in which the user enters his/her identity for accounting purposes (name and password) (this step may be automated according to user preferences) (Step C5). The user's request and identity and the identifier for the indicated portion of information (document ID and page or word range) are sent to a server (Step C6). The server verifies the user's identity (Step C7) and calculates a price for the requested operation (Step C8) and returns that price to the client-side logic (Step C9). The client-side logic determines whether the price will be accepted by the user (Step C10). If declined, the request is cancelled (Step C11). If accepted, all prior information is again transmitted to the server (Step C12) along with the agreed-upon price. The server again verifies all information (Steps C12 and C13) and verifies that the price presented to the user is correct (Step C14). If any verification step fails, the request is cancelled (Step C15). If verification succeeds, the server returns an acknowledgement to the client side logic (Step C16) which then processes the user's request by printing the indicated portion of the information (Step C17).

In a specific embodiment, an access system may be designed specifically to work with a third-party document viewer that does not directly allow the display of an authorization dialog between the print dialog and printing. Therefore, in this embodiment, the disclosed methods and systems may intercept and modify the interaction with the user during the print process, calling the system-specific print dialog mechanisms directly, bringing up the authorization dialog, completing client/server transactions, and then calling the document viewer's default printing function. In an alternative embodiment, the disclosed methods and systems may use a security handler callback that is called between the print dialog and the sending of data to the printer if such callbacks are provided by a particular document viewer.

Placing Documents into a Repository

Figure 3:
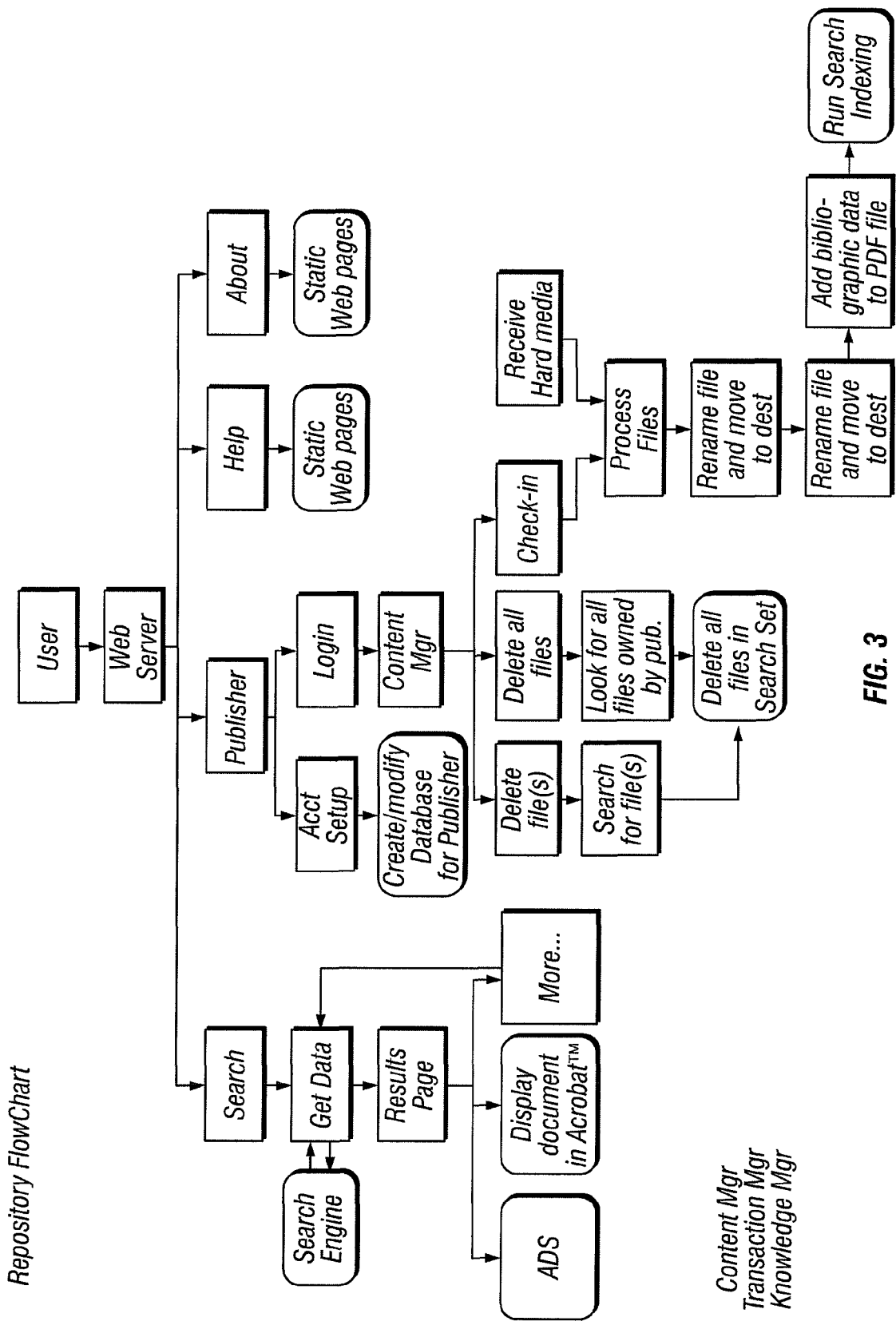
FIG. 3 is a flow chart illustrating a method for accepting documents into a repository and formatting documents for user access according to a specific embodiment of the methods and systems disclosed.

FIG. 3 is a flow chart illustrating a method for accepting documents into a repository and formatting documents for user access according to a specific embodiment. The document repository may hold the system's provided documents and may participate in restricting access to only authorized access.

In various specific embodiments of the methods and systems disclosed, the repository may have multiple versions or formats of some or all documents in the repository. For example, a low-resolution version may be available for browsing and a higher version would be available for printing.

Processing of documents for a repository may further involve one or more of the following: a check-in and processing feature, addition of security codes, addition of publisher identifications, addition of caption information. In one embodiment, an encryption key is established for each file, and a substantial part of the file is encrypted with the key. In addition, other data fields, such as bibliographic data, ownership or authorship date, etc., are added to the file. To complete check-in and processing of files, files are added to the database index and files are placed into the database.

Also, in one specific embodiment, there is provided a procedure for publishers or owners of information to login to the system and manage their own content. As shown, a publisher can create or modify database properties, review the content of databases, delete files, etc.

Creating Anthology Documents

Figure 4:
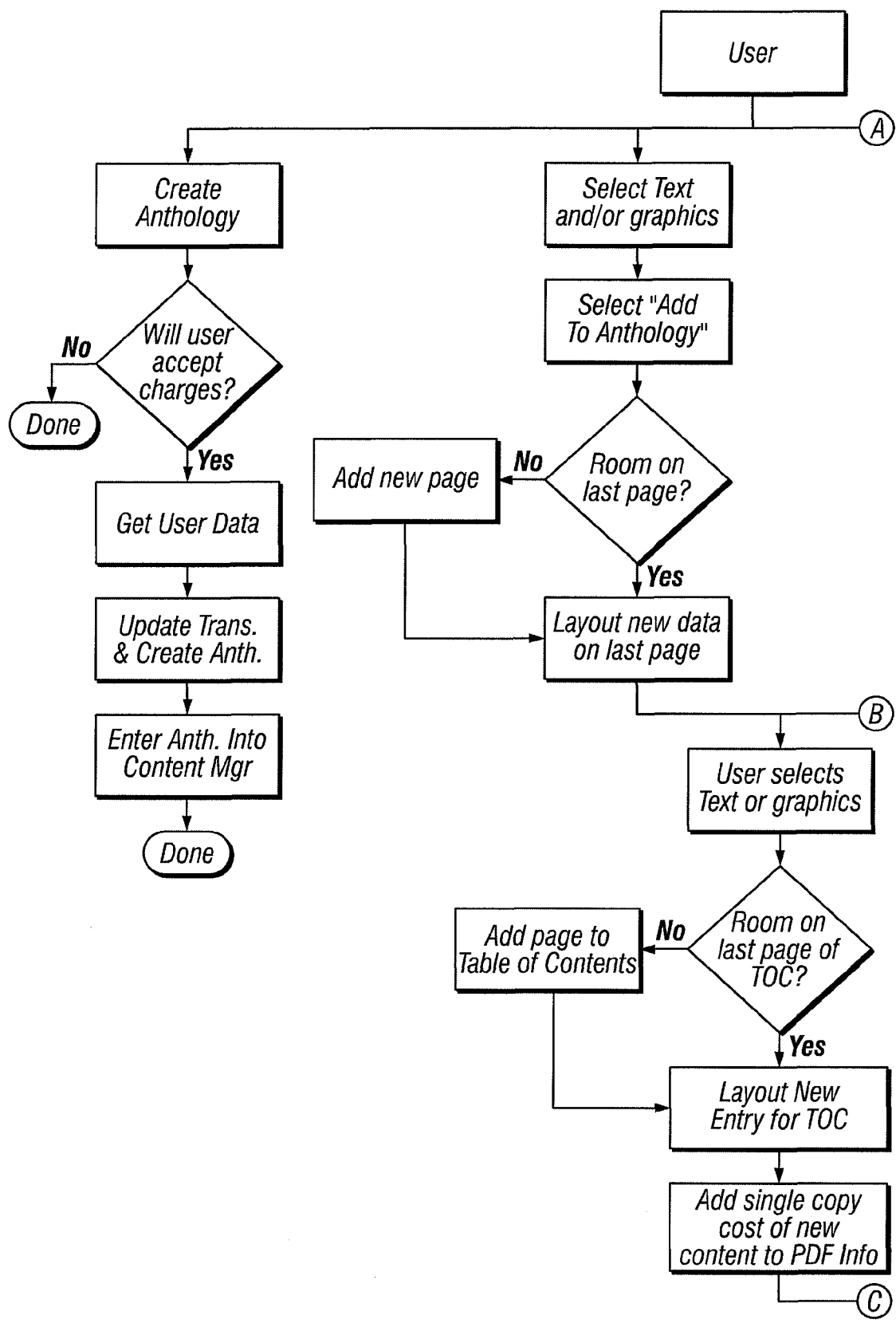
FIG. 4 is a flow chart illustrating a method for creating anthology documents according to a specific embodiment of the methods and systems disclosed.
Figure 4:
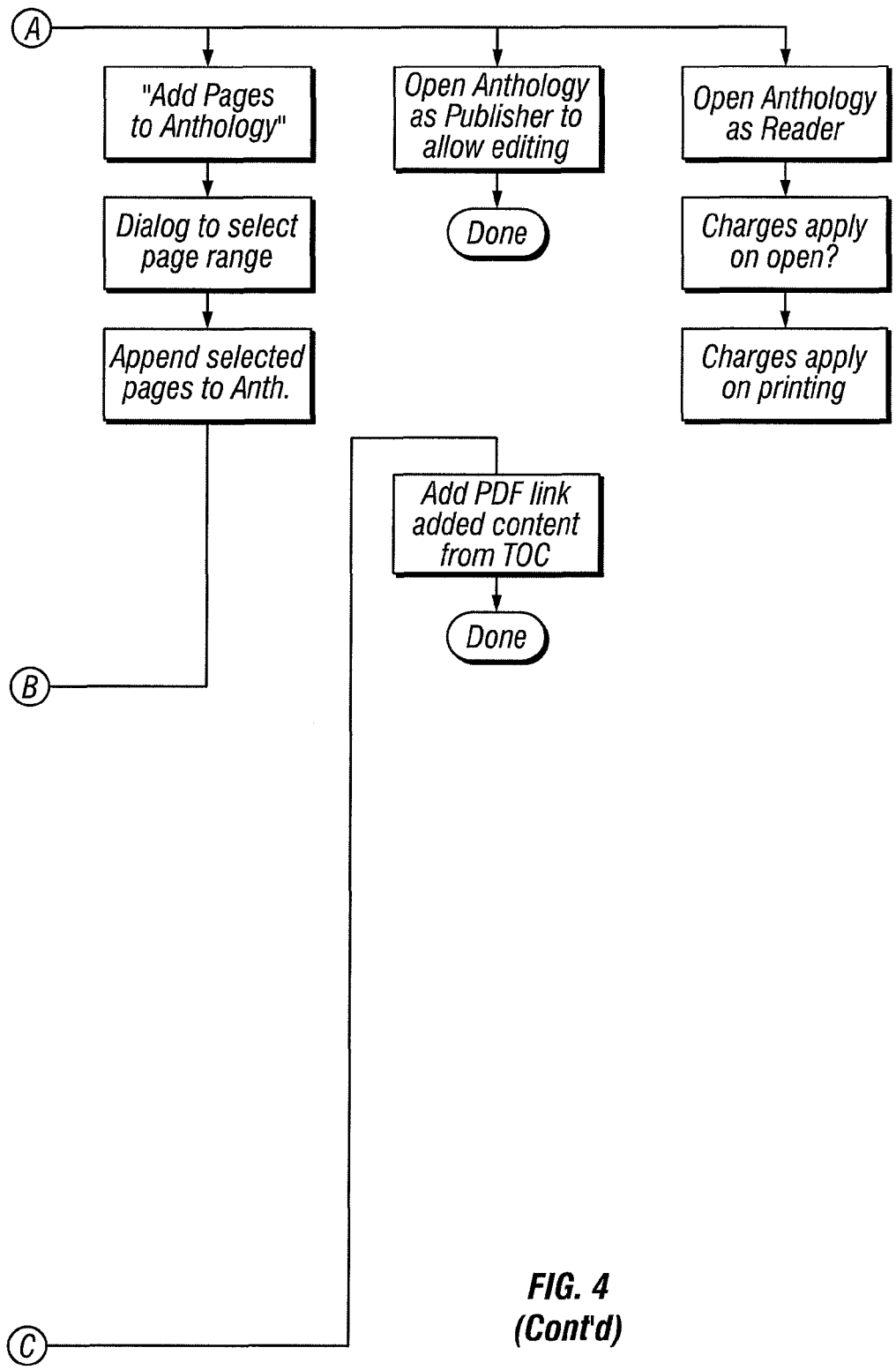

FIG. 4 is a flow chart illustrating a method for creating anthology documents according to a specific embodiment of the methods and systems disclosed. This is an optional feature that may be provided in some embodiments. A user interested in an anthology document, such as a course instructor, can selected multiple documents or portions thereof to create an anthology. A single charge can be computer for performing actions on the anthology and discounts or special rates can be applied based on a group discount feature determined by the system administrator or by individual publishers.

Integrated Information Tools

Figure 5:
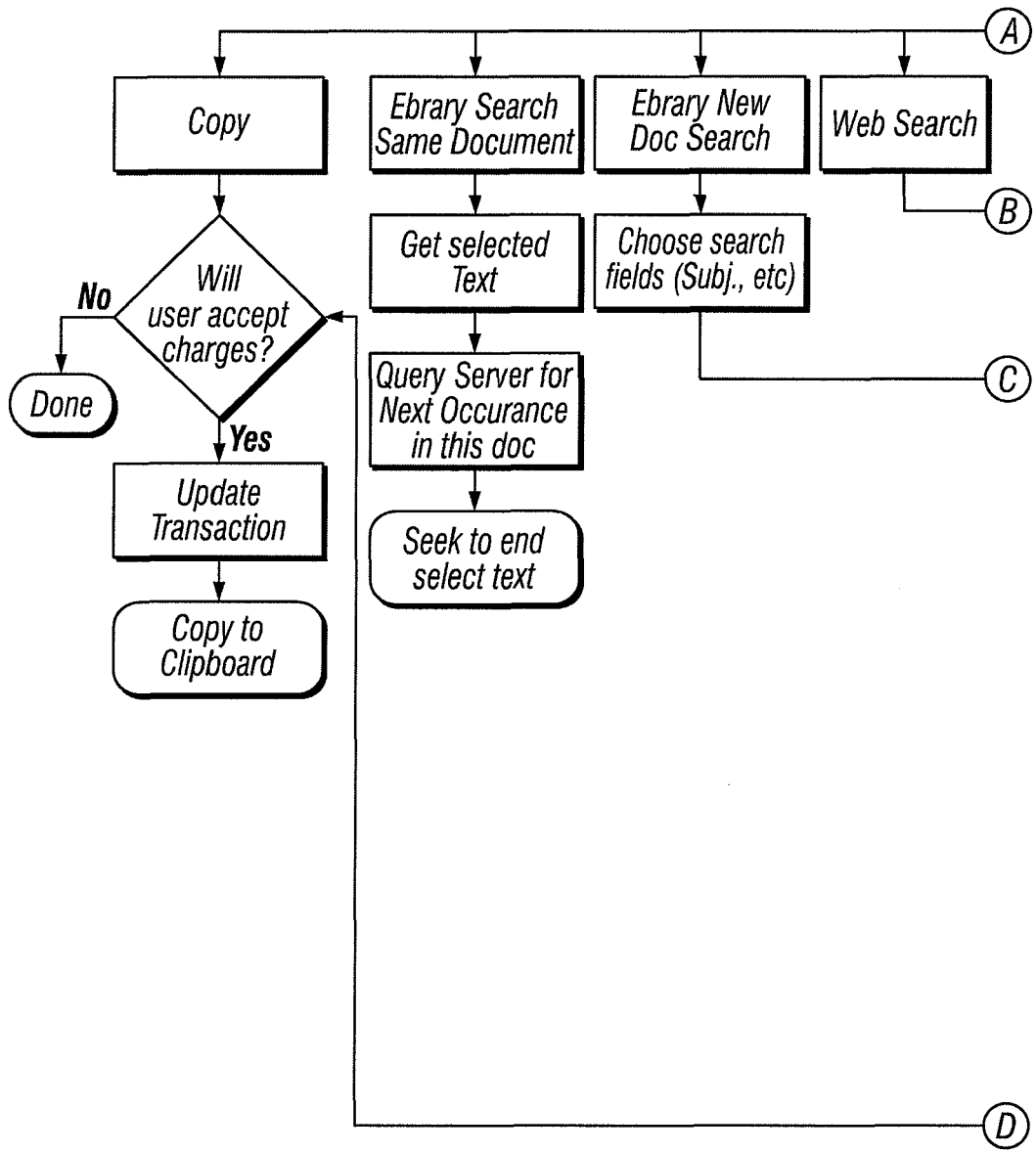
FIG. 5 is a flow chart illustrating a set of information tools integrated with user access to a document database according to a specific embodiment of the methods and systems disclosed.
Figure 5:
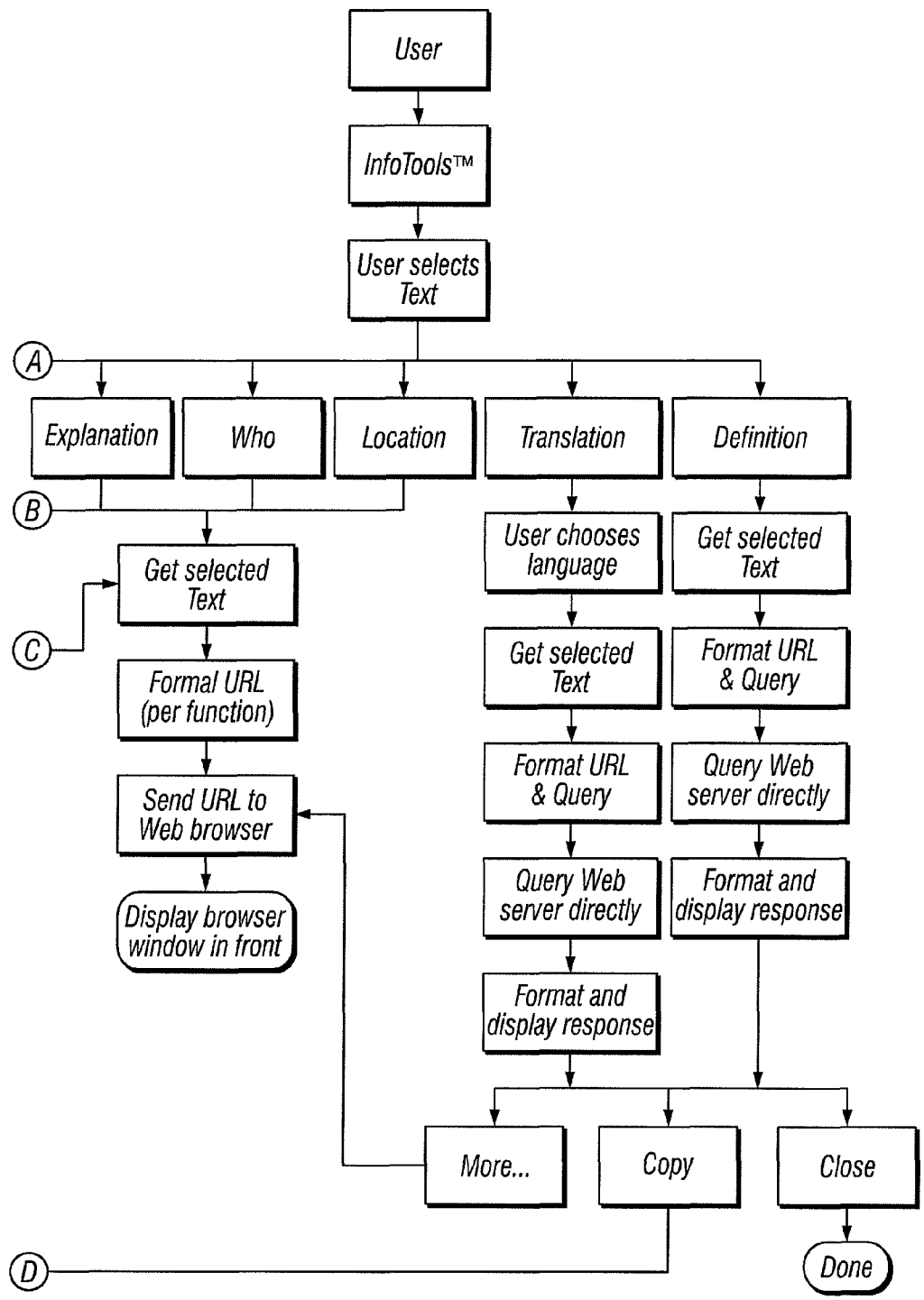

FIG. 5 is a flow chart illustrating a set of information tools integrated with user access to a document database according to a specific embodiment of the methods and systems disclosed.

As shown in FIG. 5, in this embodiment, from the user's perspective, a number of information tools are integrated with functions to provide the user seamless access to various information services. In this embodiment, a user can select text, and then, by indicating that text can access functions within the database, such as paid copying, searching within the same document, or searching in the database within other documents. The user can also request information services that may be provided outside of the system of the methods and systems disclosed, such as web searching or web-retrieved explanation, personal information, location information, word definitions, or translations services. These features may be activated by user inputs as known in the art, such as keystroke commands, menubar selection, or context-sensitive menu selection based on clicking the selected text.

Automatic Citation

According to one embodiment, the copy procedure can allow for an automatic citation function. This function retrieves bibliographic data stored in the documents or in the database at the server side and adds that data to the copied text. Bibliographic data may be formatted according to user options, such as using a different font, font effect, or size.

System Overview

Figure 6:
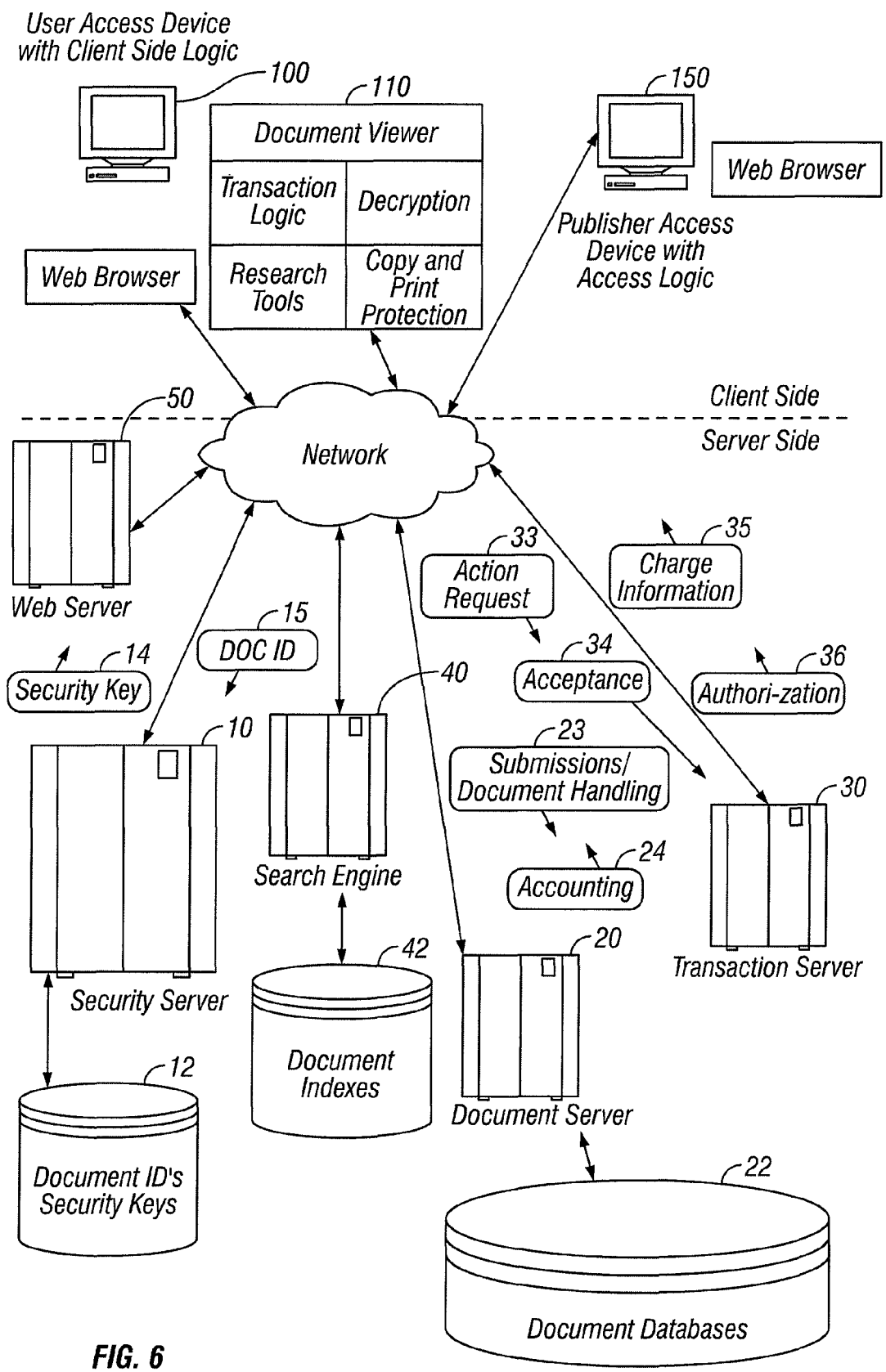
FIG. 6 is a block diagram illustrating an example system and system components according to a specific embodiment of the methods and systems disclosed.

FIG. 6 is a block diagram illustrating an example system and system components according to a specific embodiment. For purposes of explanation, components of the system, such as the security server, search engine, etc., are each shown as individual computing devices. It will be understood to those of skill in the art that this is a representation of one embodiment and that actual implementations can combine most or all of the server side functional components onto a single powerful system or can divide individual functional components on to multiple cooperating systems. Each of the components shown in this and other Figures, to the extent that it is not described in more specific detail herein, should be understood to represent logic components or logic devices that are well-understood in the art and are commercially available through third-party suppliers.

The methods and systems disclosed have thus far been described in terms of general methods and actions. The previous description, is intended to be a full and complete description and is believed to be sufficient to allow an ordinary practitioner in the art to use the disclosed methods and systems. It will be understood to those of skill in the art that the methods and systems disclosed may be implemented in a wide variety of specific programming environments, using a wide variety of programming languages and wide variety of file types.

It is intended that the previous discussion and those claims directed to the previous discussion not be limited by examples provided herein. It is further intended that the attached claims be read broadly in light of the previous discussion, unless the claims specifically incorporate details described below. Where specific examples are described in detail, no inference should be drawn to exclude other known examples.

Document Format

Figure 7:
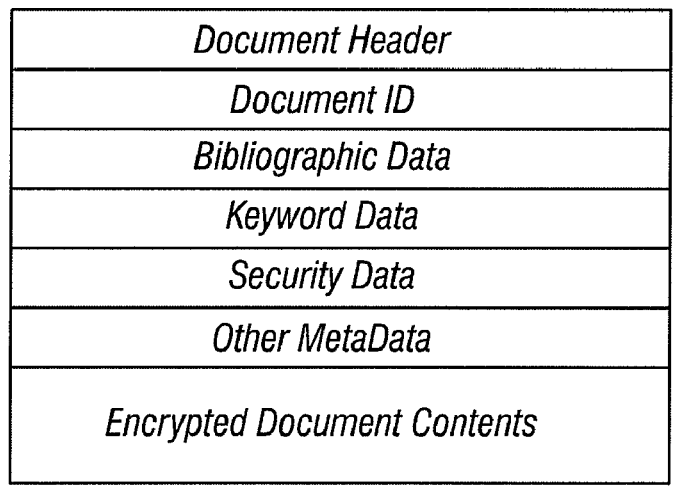
FIG. 7 is a block diagram illustrating an example document or format with security and encryption fields according to a specific embodiment of the methods and systems disclosed.
Figure 8:
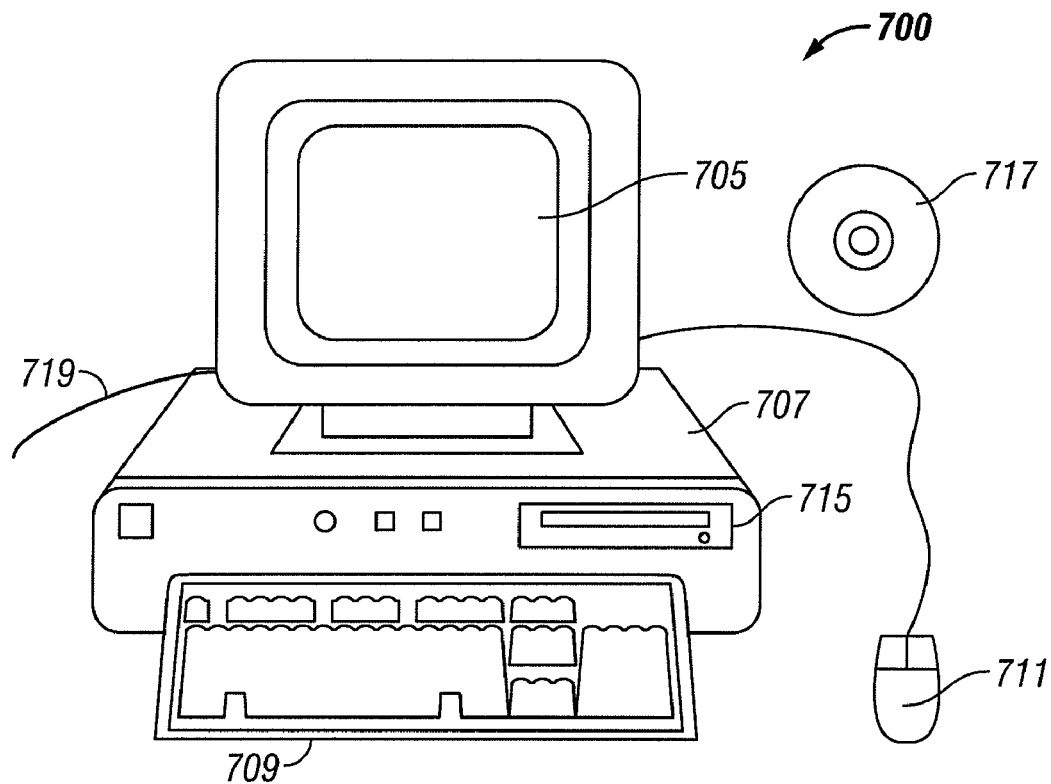
FIG. 8 is a block diagram showing a representative example logic device in which various aspects of the methods and systems disclosed may be embodied.

FIG. 7 is a block diagram illustrating an example document or format with security and encryption fields according to a specific embodiment of the methods and systems disclosed. Although FIG. 8 shows one example of a document format, it should be understood that the disclosed methods and systems may work with many different document formats. The disclosed methods and systems may work with a document format that allows for arbitrary metadata, where metadata is defined as extra content that is not normally visible in the document viewer. The disclosed methods and systems may use the metadata feature to store values such as (but not limited to) Document ID, Bibliographic Data such as Author, Title, Publisher, and Keywords, and security information such as checksums and digital signatures. A number of well-known file formats can store data generally as shown in FIG. 7, including HTML, PDF, or Microsoft Word. A propriety file format may also be used. In PDF (Portable Document Format) metadata can be stored in the Document Info and Encryption Dictionaries.

As an alternative, a document format may already allow encryption, in which case in some implementations, metadata is not needed. Furthermore, when implement with a custom or customizable viewer, a document ID in the URL or other locator string for the document may be used instead of in metadata, and all other metadata may be stored separately on the server using the document ID as an access key.

The Encrypted Document Contents can be stored in the normal content area of the document or the Encrypted Contents can be stored in the metadata area.

Searching

In a further embodiment, a system as described herein is combined with advanced searching capabilities both in individual documents and in a document library. These advanced searching capabilities allow users to quickly find information that they may be interested in purchasing.

Searched text is highlighted and documents will open to the pages that contain the text requested. Users will be presented with more clues as to what is contained within the document, and will be able to limit their searches within specific document types, or within specific subjects.

Users will also be able to reorder search results to better examine the content available to them. Re-ordering the search results by date, subjects, publishers or document relevancy, provides capabilities that empower users to find what they are seeking.

Additionally, users can perform searches within results of the previous search, allowing the user to reduce the documents to exactly what they need to find. These capabilities do not exist currently for general Internet use.

The methods and systems disclosed have thus far been described in terms of general methods and/or systems. The previous description is intended to be a full and complete description and is believed to be sufficient to allow an ordinary practitioner in the art to make and use the methods and systems disclosed. A wide variety of specific programming environments and a wide variety of programming languages and wide variety of file types may be used.

Specific Example Implementations

PDF File Format and Viewer

In one specific embodiment the PDF file format may be used for encoding textual/graphics documents. In this embodiment, a standard PDF viewer may be used that allows plug-in modules, such as Adobe Acrobat viewer.

There is a vast literature on the PDF format, and in this embodiment the disclosed methods and systems take advantage of many existing features of PDF and defines extensions to the format, as allowed by PDF, to optimize operation. Some existing features of PDF that are particularly useful for implementing this embodiment are described below. For further information, the reader is referred to available publications, including http://www.adobe.com/products/docserver/main.html; The Acrobat PDF Bible, Ted Padova; Portable Document Format Reference Manual, ver. 1.3, Adobe Systems Incorporated; Getting Started Using the Adobe Acrobat Software Development Kit (SDK), Adobe Developer Relations, and other documents available through www.adobe.com.

PDF is a file format used to represent a document in a manner independent of the application software, hardware, and operating system used to create it. A PDF file contains a PDF document and other supporting data. A PDF document contains one or more pages. Each page in the document may contain any combination of text, graphics, and images in a device- and resolution-independent format. This is the page description. A PDF document may also contain information possible only in an electronic representation, such as hypertext links, sound, and movies. In addition to a document, a PDF file contains the version of the PDF specification used in the file and information about the location of important structures in the file.

PDF and the PostScript language share the same imaging model, but there are fundamental differences between them. A PDF file may contain objects such as hypertext links and annotations that are useful only for interactive viewing. To simplify the processing of page descriptions, PDF provides no programming language constructs. PDF enforces a strictly defined file structure that allows an application to access parts of a document randomly.

Since Adobe Acrobat 2.0, it has become easy for third parties to add private data to PDF documents and to add plug-ins that change viewer behavior based on this data. A PDF producer or Acrobat viewer plug-in may define new action, destination, annotation, and security handler types. If a user opens a PDF document and the plug-in that implements the new type of object is unavailable, standard viewers will behave in a default manner. In one embodiment, private data may be added as meta-data to PDF files and in a viewer plug-in adds new security actions and modifies existing standard actions, such as print and copy.

A PDF producer or Acrobat plug-in may also add keys to any PDF object that is implemented as a dictionary except the trailer dictionary. In addition, a PDF producer or Acrobat plug-in may create tags that indicate the role of Marked Content operators.

PDF files may be encrypted so that only authorized users can read them. In addition, the owner of a document can set permissions that prevent users from printing the file, copying text and graphics from it, or modifying it. The Acrobat core API uses RC4 (a proprietary algorithm provided by RSA Data Security, Inc.) to encrypt document data, and a standard proprietary method to encrypt, decrypt, and verify user passwords to determine whether or not a user is authorized to open a document. The code that performs user authorization and sets permissions is known as a security handler. The Acrobat core API has one built-in security handler. This security handler supports two passwords—a user password that allows a user to open and read a protected document with whatever permissions the owner chose, and an owner password that allows a document's owner to also change the permissions granted to users.

Third-party plug-ins can use the Acrobat core API's built-in security handler, or can provide is their own security handlers to perform user authorization in other ways (for example, by the presence of a specific hardware key or file, or by reading a magnetic card reader.) A security handler provided by a plug-in can, if it chooses, use the Acrobat viewer's built-in dialog boxes for entering passwords and for changing permissions.

The standard encryption handler in PDF stores the encryption key within an encryption dictionary that also stores two passwords: one for "Open" (allows user to open the document for 'read-only') and one for "Owner" (allows full modification of the file). These passwords are checked before the encryption key is pulled out of the encryption dictionary and passed to Acrobat to allow decryption of the file. In a specific embodiment, the encryption handler pulls the encryption key directly from the server based on a document identifier stored in the file and only allows opening the file for read-only, never for modification.

Other Document Formats

A number of features provided under the PDF format, and in available PDF viewers, may be used to provide access to documents in other formats. In particular, document database executable files, and audio or video files, may be used which generally are not encoded in PDF.

The methods and systems disclosed can also be adapted for use with document formats, such as MS Word, which, as is known in the art, also allow for meta-data and allow for one or more associated passwords and encrypted files. Another possible format is an encrypted version of HTML, which also allows for meta-data.

For whatever document format is used, a viewer may be used that can work with code to handle aspects of security, copying, and printing. In addition, the standard document viewer(s) for a given format may be used where the viewers allow for plug-in code to handle these aspects. Standard HTML viewers and other document viewers may also allow for the necessary plug-in code. For file types, where the standard viewers do not allow for the necessary plug-in control, custom viewers may be used.

Copy Text & Graphics Interruption

As known in the art, sets of routines in the Acrobat Software Developers Kit (SDK) handle object-oriented selection of objects. There is a structure for text and another for graphics. In accordance with a specific embodiment, the AVDoc-SelectionCanCopyProc may be left alone, which allows the user to try to copy. However, the disclosed methods and systems may replace the standard selection server for text and graphics, and further replaces the callback AVDocSelection-CopyProc in order to implement authorization and billing. Note that the term "selection server" has specific meaning within the Adobe Acrobat SDK, and readers are referred to that document for details.

Print Interruption

In a specific embodiment, procedures referred to as AVDocDoPrint( ), AVDocPrintPagesWithParam( ), AVDocPrintPages( ), and PDDocWillPrintPages( ) are invoked when a user wants to print a document. According to one specific example embodiment, these procedures are replaced and printing is performed generally according to the following steps:

1. If this is not a document encrypted by a system according to the methods and systems disclosed, defer to standard print handler.
2. Display a platform-specific standard print dialog. In other embodiments, this may be replaced with a callback provided by the document viewer API (not currently available in Acrobat).
3. Get user parameters. These parameters can be checked for possible security holes (e.g. printing to a file) and the user's choice overridden for security in this embodiment. In a further embodiment, it may be first determined that a destination printer driver is an accepted one so that a user cannot hijack the data via replacing the printer driver with a dummy one, and printing can be aborted with an error dialog.
4. Get user account ID (login name and password). In the current embodiment, this is accomplished via a dialog. In future embodiments, it may be obtained from stored information or other sources (card key, etc.).
5. Verify user account information and retrieve price information (in one embodiment, retrieved via a servlet from an SQL database available remotely over the network. Parameters supplied to the database are document ID and page range; the former may come from data stored in the document info dictionary and the latter from a user selection or user input values into the print dialog GUI).
6. Present cost information to user.
7. If user declines the cost, abort printing.
8. If user accepts, send the accumulated information back to the transaction server to record and commit the transaction and await acknowledgement from the server. If acknowledgement is not received, abort printing.
9. Call the standard print handlers to do the actual printing.

Embodiment in a Programmed Digital Apparatus

The methods and systems disclosed may be embodied in a fixed media or transmissible program component containing logic instructions and/or data that, when loaded into an appropriately configured computing device, cause that device to perform interpolation.

FIG. 8 is a block-diagram showing a representative example logic. FIG. 8 shows digital device 700 that may be understood as a logical apparatus that can read instructions from media 717 and/or network port 719. Apparatus 700 can thereafter use those instructions to direct a method of image interpolation. One type of logical apparatus that may be used is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

Circuitry of an application specific integrated circuit (ASIC) or a programmable logic device (PLD) may also be used. In such a case, a computer understandable descriptor language may be used to create an ASIC or PLD that operates as herein described.

Example Screen Images

Appended to the specification, and incorporated herein, are several pages of example screen images from an exemplary embodiment. These images are presented as examples of program displays according to one specific system.

Figure 27:
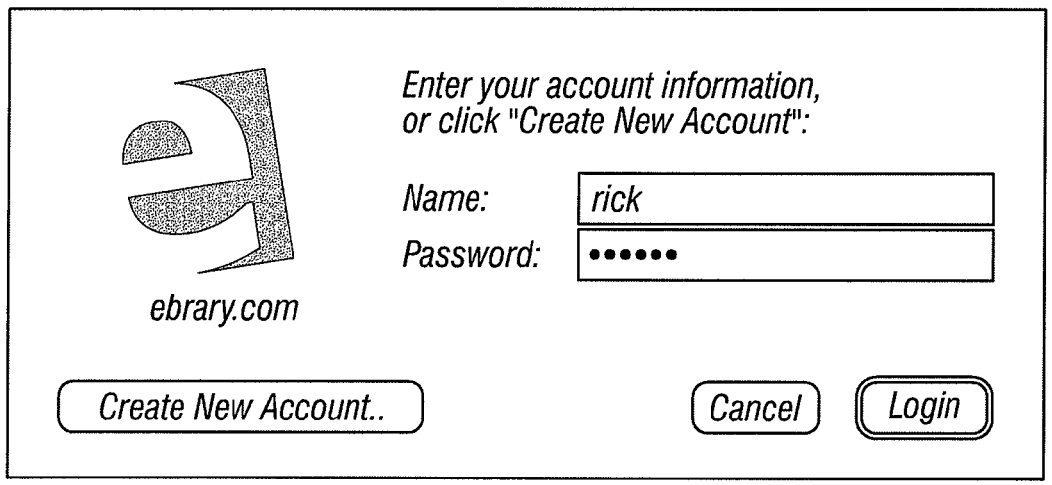
FIG. 27 shows the user login dialog.

FIG. 27 shows the user login dialog. Using this dialog, the user enters his/her Ebrary account name and password. Tis information may be used to verify the user's identity and authorize transactions charged to the user's account. If the user has no account, clicking the "Create New Account" button will open a Web page in the user's browser that will enable the user to apply to Ebrary for a new account.

Figure 28:
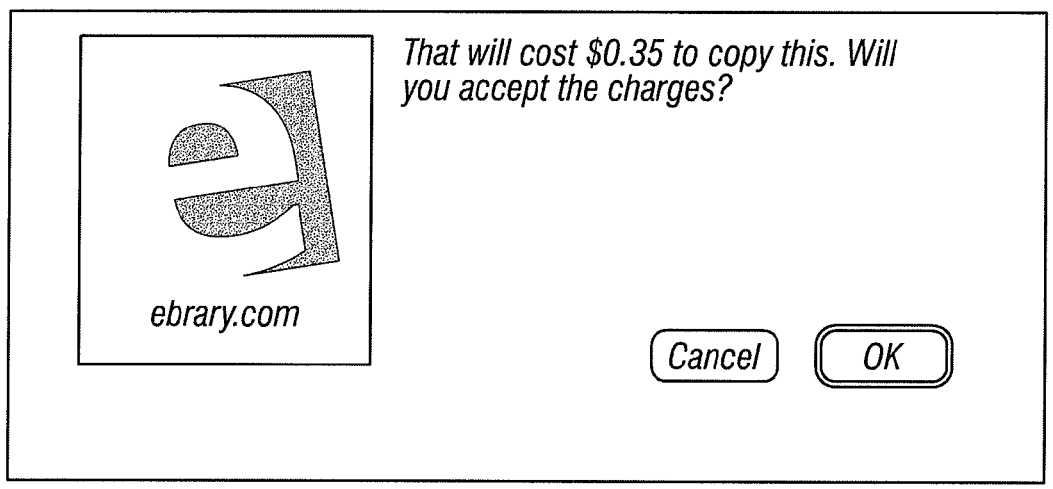
FIG. 28 shows the authorization dialog for the Copy operation.

FIG. 28 shows the authorization dialog for the Copy operation. The user is presented with the cost of a requested copy operation. By clicking the OK button, the user authorizes the charge to his/her account, and enables the copy operation to proceed. By clicking the Cancel button, the user declines the charge, and the operation is aborted: no copying takes place and the user's account is not charged.

Figure 29:
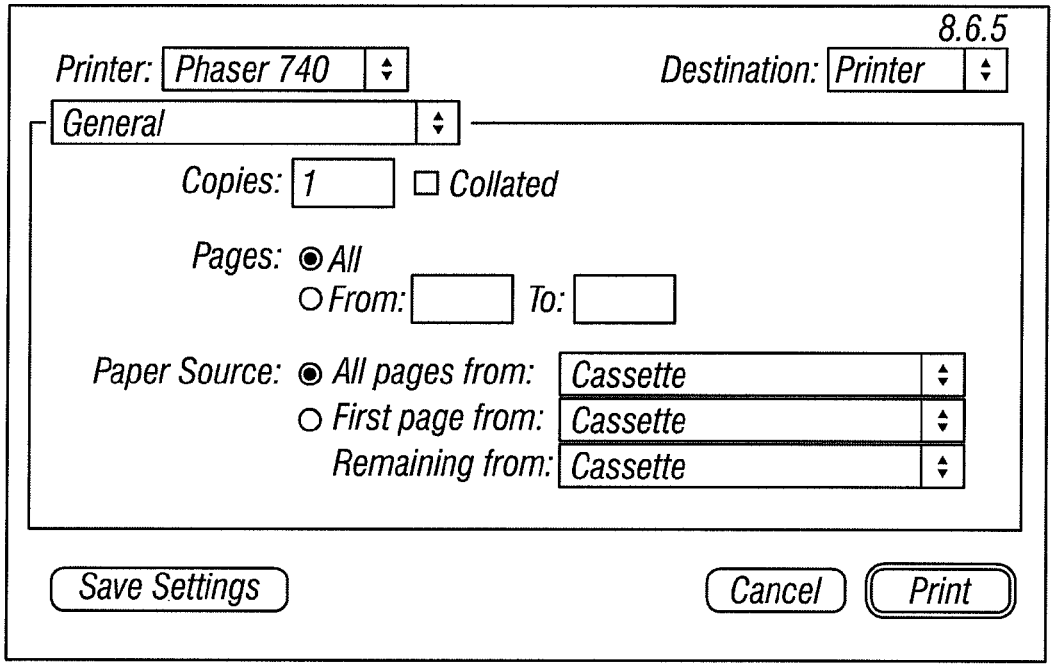
FIG. 29 shows the standard print dialog.

FIG. 29 shows the standard print dialog for one of the systems that supports a specific embodiment. This dialog is provided by the operating system but in some embodiments it is presented as a result of a direct request. The user will enter a page range and other information affecting the requested print operation; and some or all of that information will be harvested in order to help determine authorization and cost for the operation.

Figure 30:
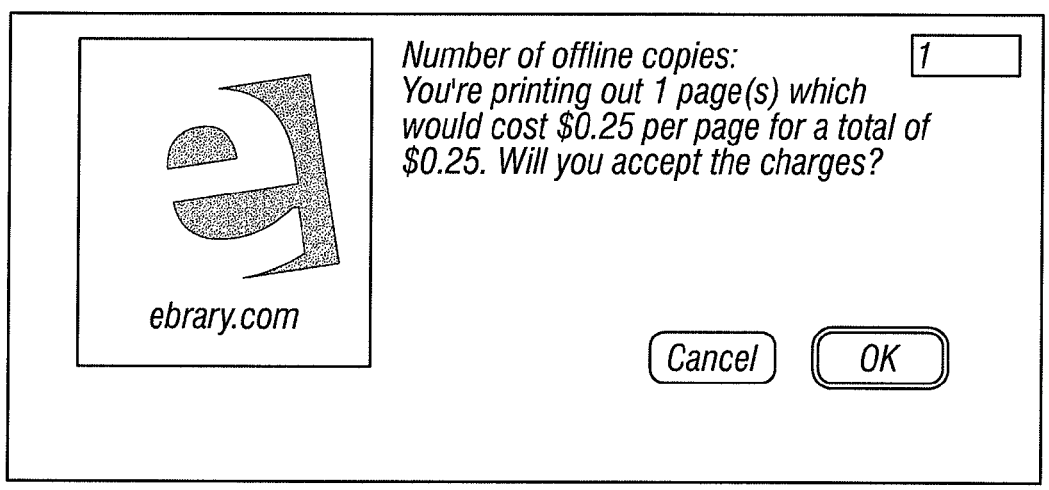
FIG. 30 shows the authorization dialog for the Print operation.

FIG. 30 shows the authorization dialog for the Print operation. The user is presented with the cost of a requested print operation. By clicking the OK button, the user authorizes the charge to his/her account, and enables the print operation to proceed. By clicking the Cancel button, the user declines the charge, and the operation is aborted: no printing takes place and the user's account is not charged.

Figure 31:
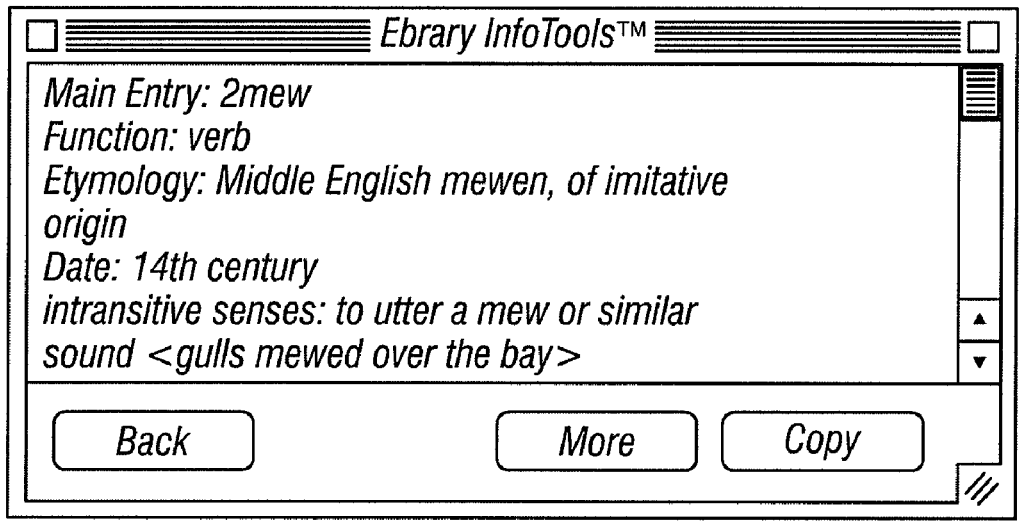
FIG. 31 shows the InfoTools Window.

FIG. 31 shows the InfoTools Window in which information requested by the user is sometimes displayed. In this figure, a portion of a word definition is displayed. This window may also be used to display other kinds of information, including but not limited to translations of selected text into other languages.

Figure 32:
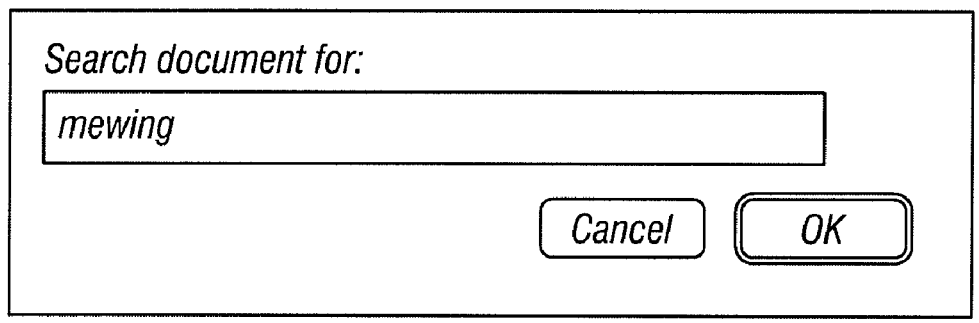
FIG. 32 shows the Search Document dialog.

FIG. 32 shows the Search Document dialog. Using this dialog, the user enters a text string to be searched for. When the OK button is clicked, the database may be queried and the search engine via the network used to determine the locations within the currently-displayed document where that text (or similar text) occurs. The reply from the server enables those locations to be quickly displayed.

Figure 33:
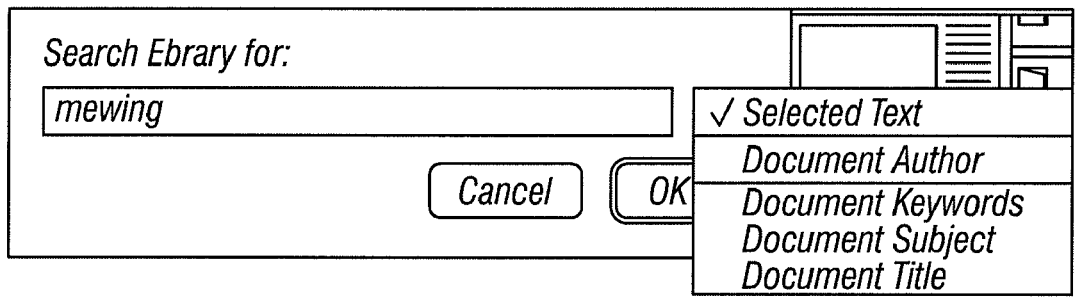
FIG. 33 shows the Search Ebrary dialog, with a popup menu displayed.

FIG. 33 shows the Search Ebrary dialog, with a popup menu displayed. Using this dialog, the user enters a text string to be searched for. The popup menu allows the user to easily enter certain strings pertinent to the document including the currently selected text and the document's title, author, subject, and keywords; however the user may also enter any arbitrary string. When the OK button is clicked, the database may be queried and the search engine used via the network to compile a list of documents in which that text (or similar text) occurs. The results of the search are displayed in the user's Web browser.

Figure 34:
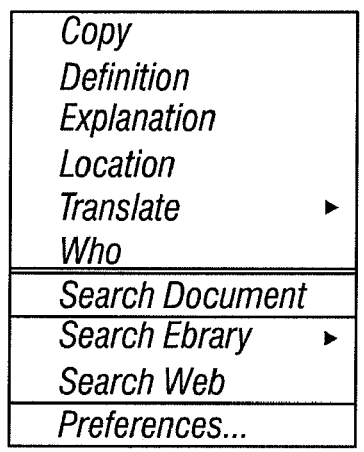
FIG. 34 shows a version of the InfoTools menu.

FIG. 34 shows a version of the InfoTools menu, which gives access to the InfoTools features while the user is viewing a document. The menu offers the user controls for performing searches, looking up information on the Internet, copying text to the clipboard, performing language translations, and viewing and adjusting the user's preferences with regard to the operation of InfoTools.

Figure 9:
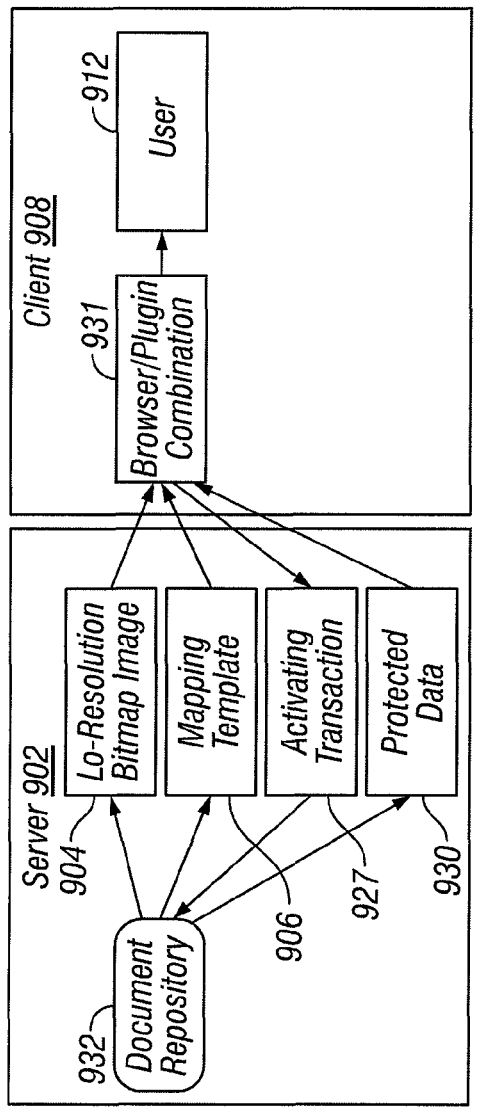
FIG. 9 is a block diagram of a system for providing secure information transfers using an improved technique for implementing the encryption function.

Referring now to FIG. 9, a preferred embodiment of the system that utilizes a low-resolution bitmap-image 904, visible to the user and a mapping-template 906, which may be invisible to the user 912 but contains information mapping the location of words or other points of interest on each page of the document 927, to provide the desired encryption function. The user 912 receives and may view the low-resolution bitmap-image 904 and utilizing information contained in the mapping-template 906, then select the locations of one or more words or objects on the low-resolution bitmap-image 904 as displayed, to facilitate, for example, highlighting desired objects in a manner similar to conventional word processing programs. The selected locations on the low-resolution bitmap-image 904 correspond to the mapping information contained in the mapping-template 906. The server then uses the selection of the one or more locations provided by the user, upon proper payment of fees if any, to provide high-resolution bitmap-images and/or text-representations of the selected objects or words to the user 912 for printing, copying or editing or other tasks. This facilitating secure encryption by providing only non-protected data to the user 912, the low-resolution bitmap-image 904 and mapping-template 906, prior to completing activating transaction 929 to facilitate transmission of protected data 930.

In particular, system 900 includes server 902, which sends low-resolution bitmap-image file 904 and mapping-template file 906 to client 908 via a network such as Internet 910. User 912 while viewing monitor 914 is able to view low-resolution bitmap-image file 904 and interact with the displayed low-resolution bitmap-image 904 by, for example, highlighting object 916 on page 918 of document 927, represented by low-resolution bitmap-image 904 to select object 916 which may include one or more words. This viewing is facilitated through a browser/plugin combination 931. Client side software 918 detects the highlighting performed by user 912 and sends selection information 920, corresponding to the location on the displayed bitmap-image of object 916 to server 902. Server 902, upon receipt of the selection of object 916 by user 912, and/or payment or confirmation of permitted access by user 912, sends high resolution bitmap-image 922 or text-representation 923 of selected object 916 to client 908 for printing, copying, editing, saving or other permitted operations by user 912.

In this manner, protection of high-resolution bitmap-images such as bitmap-image 922 and the text-representation 923 contained therein is accomplished because only the low-resolution bitmap-image 904 is available to the user 912 until proper payment or other authorization is confirmed. Although mapping-template 906 is also sent to client 908 for use by user 912, the information contained in mapping-template 906 is related only the location of objects on specific pages of low-resolution bitmap-image file 904, but does not indicate the content at such locations.

Beyond the fundamental advantages of the system 900's ability to deliver PDF documents in a secure manner, the system design allows for the delivery of other document formats in the same manner, for example (but not limited to) HTML, XML, ASCII text, MS Word documents and other word processing documents. Any document on a computer including multimedia formats such as graphics, audio and/or video, is a candidate for delivery under the auspices of this system. System 900 may also be used as an integrated version control for documents.

Other types of payment strategies may also be used with system 900, such as all-you-can-eat, or time-based rental rather than micro-transaction based; Utilization of multiple search/storage databases to allow for the creation of custom collections of documents for clients/customers and customized web-sites and interfacing schemes to meet the varying requirements of differing clients/users such as conversion of data for use for audio books or reading to sight-impaired or translation of the material to alternate languages such as example Arabic or Japanese.

In an alternate embodiment, client side software 918 may include the ability to determine the location of the selected documents in the secure document repository 932 based on desired text information and forward that information to the server. Such document location information may be determined by the server 902 again without making protected data 930 available to the user 912 prior to confirmation of an activating transaction 927 such as proper payment or other authorization.

Figure 10:
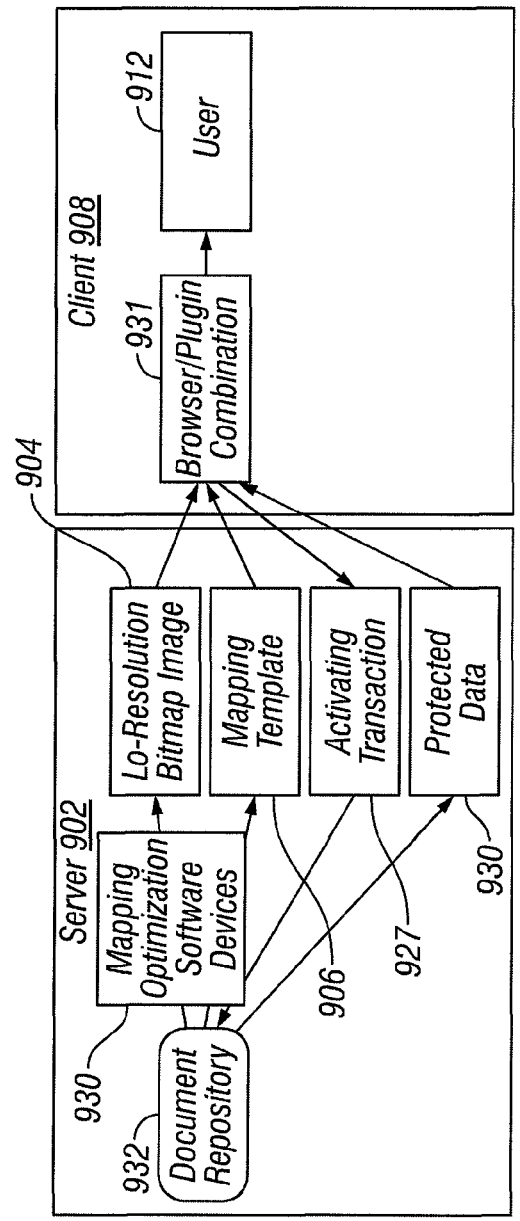
FIG. 10 is a block diagram of the system of FIG. 9 including the addition of a mapping optimization function.

Referring now to FIG. 10, system 900 may be improved by the addition of mapping optimization software devices 930 to make the selection process more intuitive to user 912, for example, by simulation the operations of a word processor so that multiple objects selected appear as a continuously selected or highlighted region in a left to right, top to bottom manner as is indicated by natural reading order. For example, in FIG. 11, user 912 may use a pointing device, such as mouse 926, to select the first few lines of text appearing on low-resolution bitmap-image 904, but due to the multi-column layout of the image, receive a non-intuitive selection of words, represented by the selected text contained in the first column 928 & the second column 929, rather than just the first column 928. The intuitive and desired result is shown in FIG. 12.

In a further embodiment for these mapping optimization software devices 930, we are also developing applications of these technologies for utilization outside the context of the overall system 900 to allow for the same facilities to be made available in a stand-alone context such as when displaying PDF files in alternate consumer-off-the-shelf (COTS) applications such as Adobe Acrobat and Adobe Document Server. Thus enhancing the utility of these COTS applications.

Mapping optimization device 930 may include software for providing mapping optimization by normalizing, columnizing and regionizing in order to permit selection of text to work as expected in order to select words in their nature order.

Figure 13:
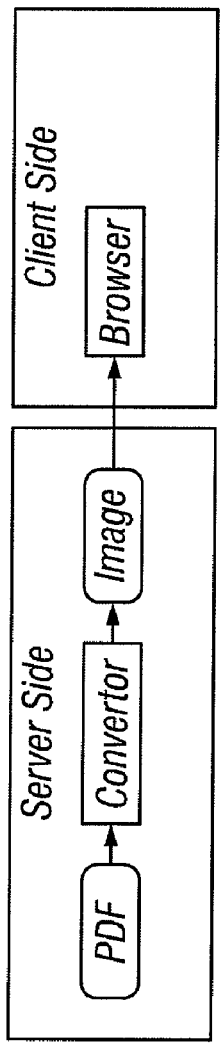
FIG. 13 is a block diagram of one implementation of the secure information transfer system.

Referring now to FIG. 13, the operation of a preferred embodiment can best be understood in light of EDF Display Protocol (EDF-DP). Utilizing PDF for the web-based delivery of content can be problematic for various reasons. The PDF standard does not include support for displaying single pages out of a larger document without first downloading the entire document, thus forcing a user to download an entire document before a single page can be viewed. This can be a very time-consuming undertaking, particularly on a slow connection. Also, since the PDF standard is designed to allow for the reproduction of absolutely identical copies of an entire document, there is a security risk in allowing users to view PDF documents over the web, because by giving them the ability to view the document, they are also given the ability to print and reproduce it in entirety and identical to the original, creating a risk of piracy and/or unwarranted disclosure of confidential information.

EDF-DP (Ebrary Document Format-Display Protocol) was developed to address both the single-page and security issues inherent in the PDF standard. System 900 uses a new display strategy which provides a methodology for displaying PDF-based content information on the web in a secured, page-by-page, real-time environment. In EDF-DP, rather than downloading PDF data for the purposes of displaying a page, the PDF may be passed through a converter that generates a graphic image which is preferably an exact representation of the page that was requested. This image is then forwarded to the user via the Internet and then displayed in the browser window.

This allows the user to view a given page, but addresses the issue of pirating/security, because rather than downloading the actual text information, only a low resolution image is provided. In particular, EDF-DP is a methodology for displaying single pages from PDF-based documents in a secure manner via the Web. This is achieved by displaying an image of a page from a PDF in the browser window, rather than the actual PDF data, (as is done with Acrobat, the native PDF viewing system.) This approach keeps the environment secure as the text data for the document remains on the server side during display.

Since only an image is displayed in the browser window rather than the actual PDF data, additional processing is needed to extend the functionality of the browser to allow for the image to be displayed in an environment similar to Acrobat reader, which is the native environment for the display of PDF documents. This is provided via a browser plugin called "ebrary Reader." Ebrary Reader provides the same sort of functionality the user is used to seeing in Acrobat reader. These functions include (but are not limited to) Next/Previous Page, Go to Page, Zoom in/out, Table of Contents, Page number display, etc. This plugin complies with the NSAPI format for Netscape based plugins and is stored in the NPInfotl.dll file in the browser plugins directory. The ebrary Reader is automatically installed the first time a user accesses a document on an ebrary-sponsored site. In an alternate embodiment of the ebrary Reader plugin we use Active-X as a delivery mechanism, which is stored in the ebraryRdr.ocx file and registered with the computer system's OS.

As noted above, EDF-DP is a methodology for displaying single pages from PDF-based documents in a secure manner via the Web by displaying an image of a page from a PDF in the browser window, rather than the actual PDF data, (as is done with Acrobat, the native PDF viewing system.) This approach keeps the environment secure as the text data for the document remains on the server side during display. However, since only the image of the page is displayed, and the actual text version of the document remains on the server side, additional functionality is required to allow the user to perform selection of text, as in a word-processing environment, for purposes of copying, highlighting, and/or performing additional searches and similar tasks.

In order to allow for the selection of text in the ebrary Reader environment, only one piece of additional information is required from the server, the coordinates of each word on the page. This can be represented by a straight-forward mapping of the pixels that represent each independent word. Since the graphic image representing the page is simply an array of dots (say, 800×1200 pixels), then the location of each word on that page can be defined by the bounds of the box of the pixels on the page which represent that portion of the image.

Figure 14:
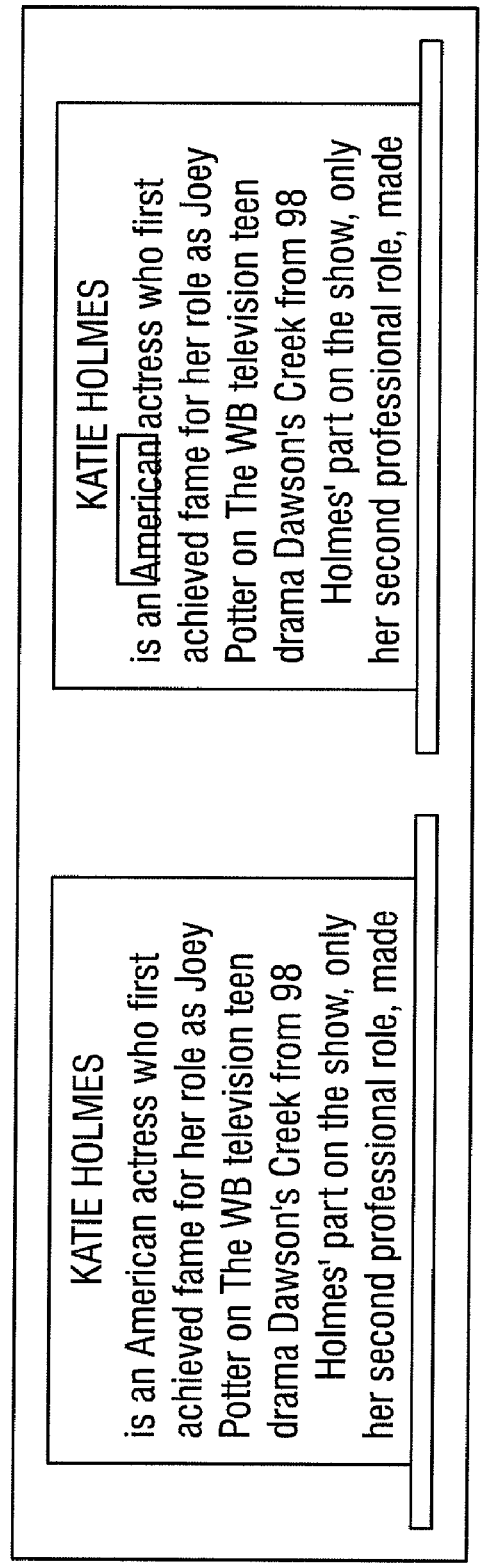
FIG. 14 is an illustration of a page of text in which a bounded area has been selected surrounding the word "reasoned".

Referring now to FIG. 14, in a 400×800 image (truncated for illustration), the upper left-hand corner of the word "reasoned" found on the first line is 57, 32—and the lower right-hand corner of the word is 88, 38.

Since each word on the page has a unique address which is constant, to support selection behavior in the viewer, the plugin only needs to know the bounds of the page, the number of words on the page, and the bounds of each word on the page. Thus, when the user points to a word on the page with the mouse and clicks, the plugin needs only search through the list of bounds of words on the page (called bounding boxes) to see if the location of the mouse click falls within any of those regions. If so, then the rectangle number is saved as the "selected" word number, and the associated pixels for that bounding box are inverted on the graphic, indicating that the word has been selected. Similarly, if a range of words is selected, then the first and last word in the range is saved, and all rectangles in that range are inverted.

Figure 15:
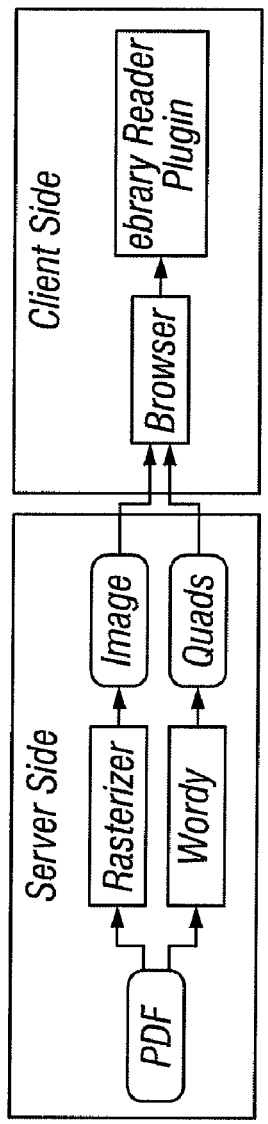
FIG. 15 is an illustration of the use of the "wordy" function to generate the mask or template.

As shown in FIG. 15, the server generates and provides the quad data to the client. This is done via a server-side process called "wordy".

Figure 16:
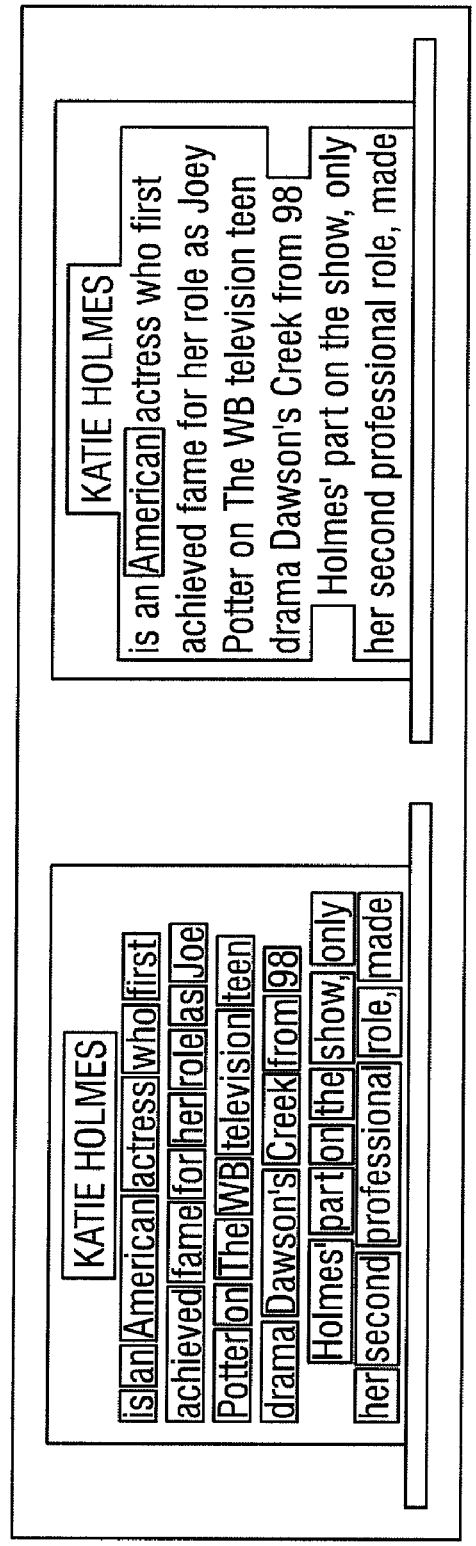
FIG. 16 illustrates the operation of the normalizer function.

Referring now to FIG. 16, the operation of the "normalizer" process is shown. The bounding boxes of words on the page, as described above, are designed to tightly define the location of a word. It cannot be assumed that the bounding boxes of sequential words will be precisely adjacent on the page. This leads to a problem in selecting text which we refer to as the "ransom note" effect, shown on the left side of FIG. 16 in which the bounding boxes for individual selected words are separated by white spaces.

To reduce or eliminate the ransom note effect, the quads are run through a process called the Normalizer, which checks rectangles and expands or contracts them so that they butt against each other vertically and horizontally. Though this process could be performed on the client-side rather than on the server side, performing the process on the client-side provides advantages, for example providing flexibility during debugging of quad data. In particular, the programmers are able to easily turn off the facility and inspect the actual quads as they are produced, rather than the finalized, adjusted or normalized versions.

In an alternative embodiment, the Normalizer could be placed on the server side and the plugin allowed to request either normalized or non-normalized rectangles if desired. This would necessitate either adding a server-side normalization capability to the process which provides the quads to the plugin, or the storage of both normalized and non-normalized quads.

Figure 17C:
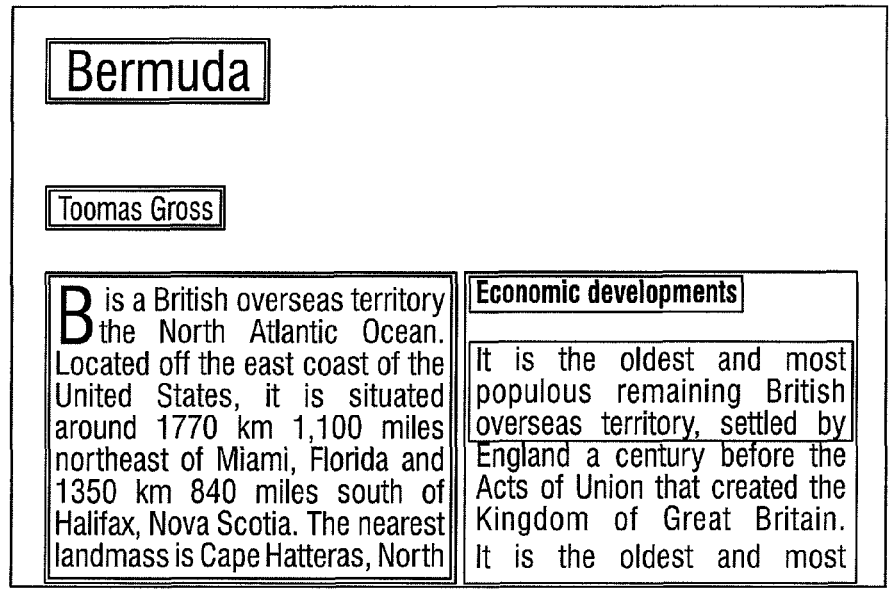
FIG. 17 illustrates the problems to be solved by operation of the columnizer function.

Referring now to FIG. 17, the operation of the columnizer function is shown. One of the limitations with the use of vector based standards, such as PDF, is that the order in which the viewer would read words on the page is not necessarily the same as the order that the words would appear in the PDF file. That is to say, that while each word in the PDF does have a discrete location on the page and with regard to other words, it is not always the case that the order of the words which appear in the document is the same as the order in which a user would read them on the page. For example, the phrase "Mary had a little lamb" might be encoded in the PDF as "lamb Mary little had a."

This effect is due to artifacts in the original programs which generate the PDF files and which each have their own unique strategies for formatting a printed page. Since it is a computer rather than a user which actually generates the PDF files, the order of words is much more likely to be that which makes sense to a computer or printer, rather than the user.

One classic case of this phenomenon occurs when multiple columns of text appear on a single page. For example in the following case the words "Economic Development" in the title on the second column actually appear between the words of the first and second rows of the first column.

Thus, if the selected text above were to be copied, the returned text would be "Bermuda's flexible regulatory condi-Economic Development tions, strong infrastructure, neutral tax conditions, and advanced The Bermudian tourism Industry is contin-Internet services and legislation continued . . . " Notice that the text is copied from left to right, top to bottom, without consideration of the columns which appear on the page.

The preferred result would be to have all the words in the first column listed first, then the second, resulting in "Bermuda's flexible regulatory conditions, strong infrastructure, neutral tax conditions, and Internet services and legislation continued . . . " etc. Additionally, the undesired behavior of joining the lines between the columns during selection (caused by the Normalizer processing as though the words appear on a single line) needs to be eliminated. The proper section state appears in FIG. 17b.

In order to reorder the words on the page it is necessary to determine where the blocks of text on the page are placed, that is, the locations of the bounding boxes of the columns on the page. There are 4 main regions of text, as shown in outlined fashion in FIG. 17c.

Referring now to FIG. 18, the identification of the appropriate text regions can be accomplished using the same information that the ebrary Reader uses to facilitate selection behavior, the overall size of the page and the bounding boxes of all words that appear on the page. Rather than focusing on the location of the words on the page, in a preferred embodiment, the spaces between the words are used. In particular, a mathematical translation of the data, called an orthographic projection, is performed to identify the regions of whitespace in one direction or another based on the density of the data.

An orthographic projection is a reduction of order of magnitude of sample of data, or simply stated, a "shadow". For example, consider a ball placed in front of a lamp, casting a shadow on the wall. The ball is spherical, a three-dimensional object, while the shadow on the wall is a circle, a two-dimensional object. The shadow is a 2 dimensional representation of the three-dimensional ball. By doing a similar translation of the two-dimensional "quad" data which identifies the word regions on the page, a one-dimensional vector is obtained which represents the density of words on the page in one direction or another (horizontal or vertical).

Figure 18A:
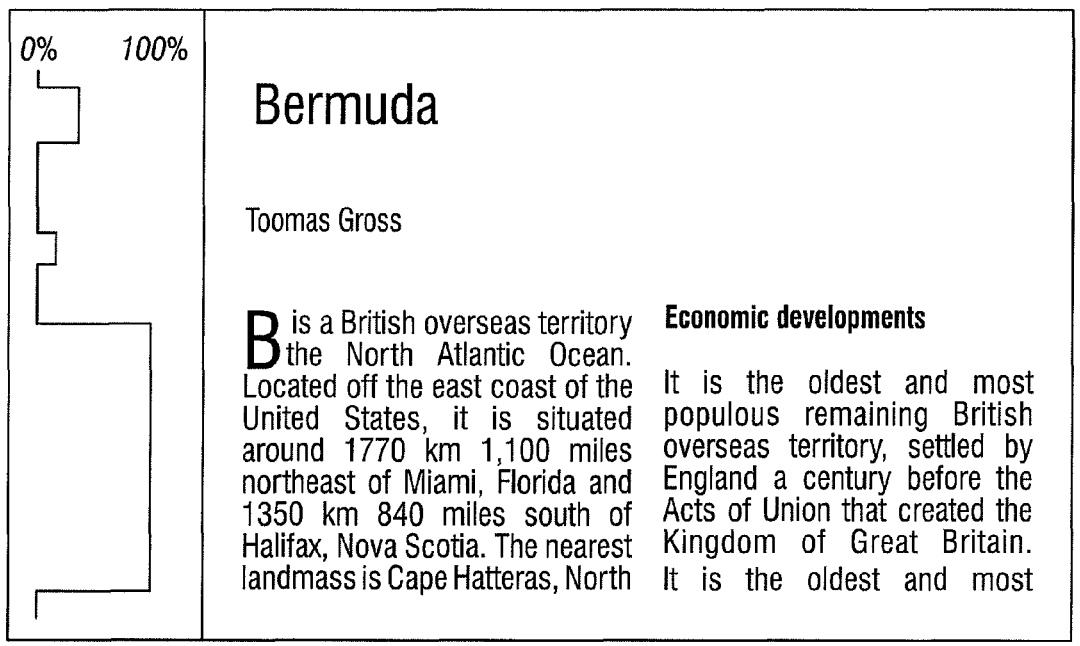
FIG. 18 illustrates the operation of the columnizer function.

The translation is executed by first creating a linear array of integers the same size as the height of the page and setting each value of the array to zero. The all of the word-rectangles on the page are reviewed to determine and save the width of each rectangle in each of the corresponding y values for that rectangle. So, for example, if a rectangle has an upper left-hand corner of 5.10 and a lower right-hand corner of 20.25 then values 10-25 in the vector would each be incremented by the width of the rectangle, which is 15 (20-5). This is done for all rectangles on the page. To find the main vertical regions of the page, one need only scan the vector array looking for regions of "zero" values, as these indicate the vertical whitespace on the page. This translation is illustrated in FIG. 18a with the resultant vector shown on the left edge of the drawing.

Figure 18B:
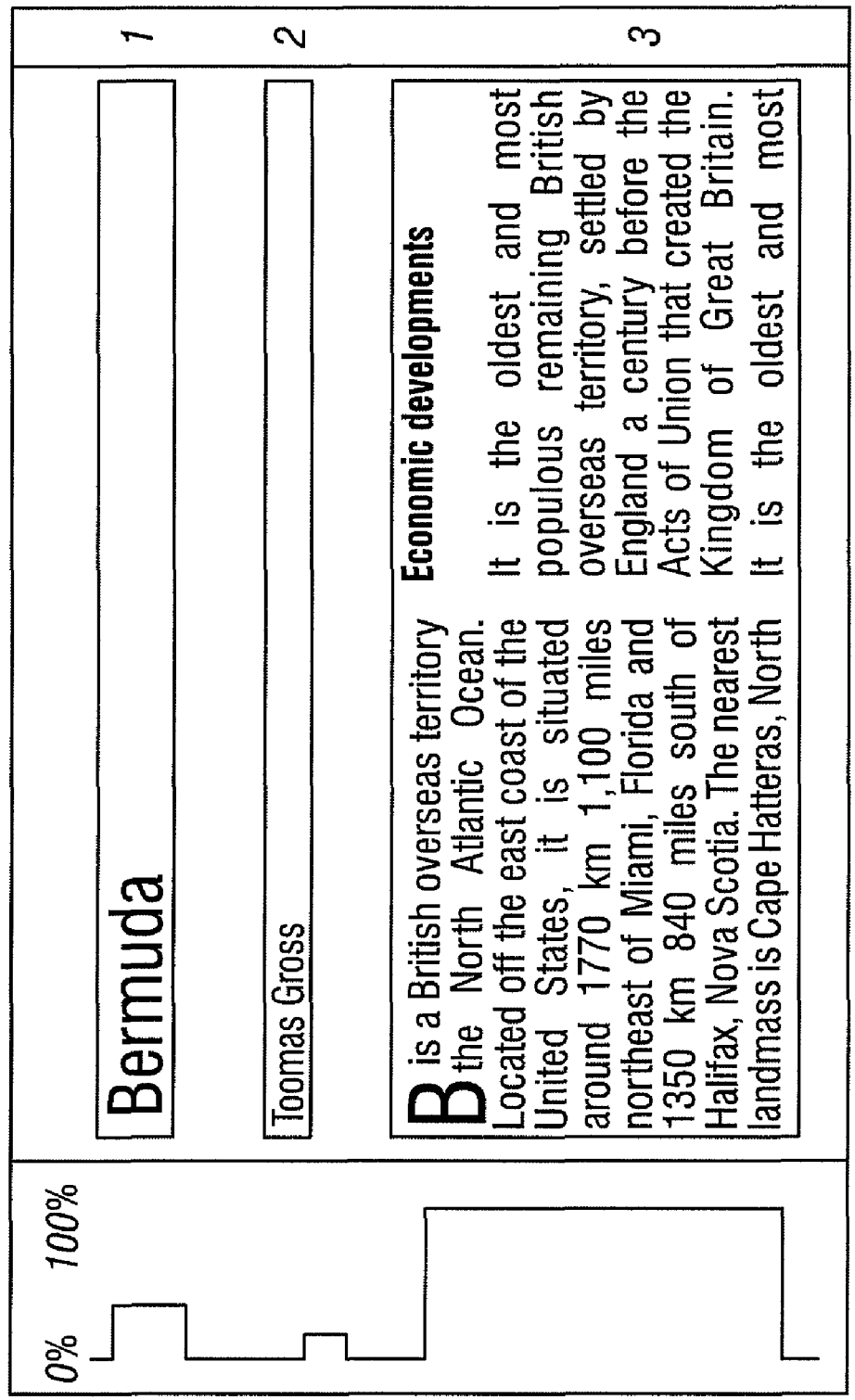

Using the ranges of zero values as indicators, the page may be broken up into three vertical subsections as shown in FIG. 18b.

Figure 18C:
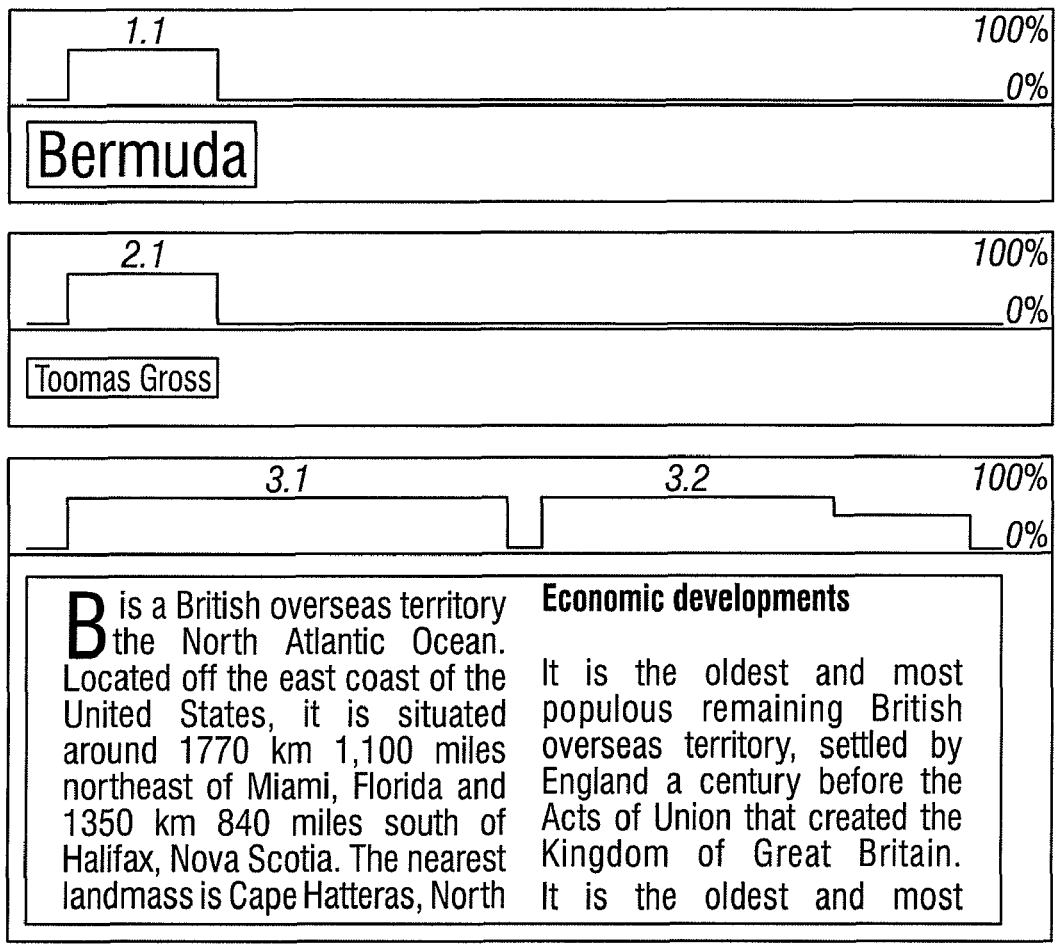

These three regions of the page may then be placed in a list and the process may then be repeated time in a horizontal manner on each of the sub regions as shown in FIG. 18c.

The result of these operations identifies a total of 4 regions found on the page, as shown in FIG. 18d.

Referring now to FIG. 19, the process may then be repeated recursively (vertical then horizontal) placing newly found regions in a tree structure as children of their parent region until no new regions are found, which indicates that all regions have been found.

Once all regions have been identified, the tree is traversed and any identified terminal node (nodes for which there are no children) can be considered a valid region. As each region is found, the words on the page are checked to determine if they fit within that region, if so, the rectangle is moved to the front of the list of rectangles, in front of those not checked or not in the region, but subsequent to those which have been checked. This succeeds in reordering the words on the page so that the words in the first region appear first (in the same order in which they originally appeared within the region, then those in the second region and so on. This reordering of words provides the desired selection behavior described previously.

Figure 20A:
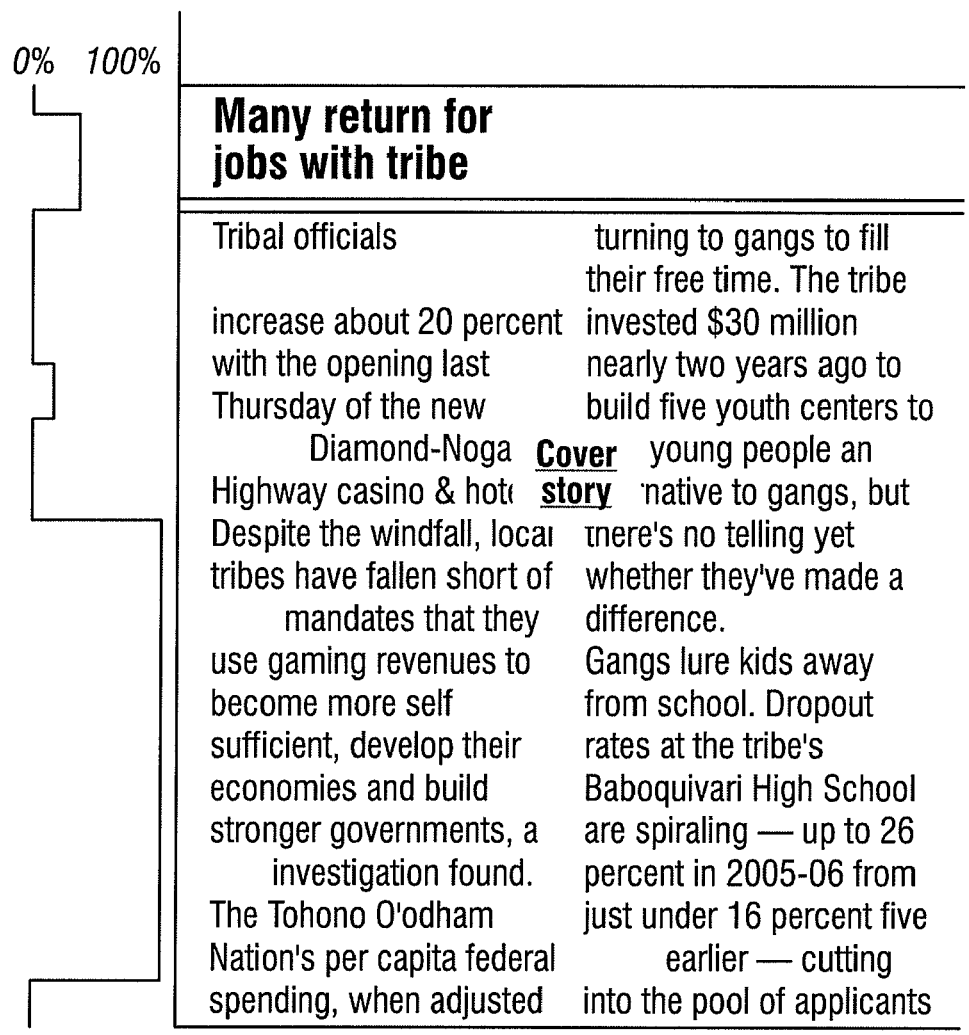
FIG. 20 illustrates an example of the problems that operation of the regionizer function may be used to correct.

Referring now to FIG. 20, the problems that operation of the regionizer function may be used to correct. In particular, in FIG. 20a, the Columnizer process may fail to find all regions on complicated pages such as those found in periodicals (magazines, newspapers, etc.)

Here the algorithm will successfully find the first two vertical regions on the page, but will fail to find the columns in the lower region, due to the call out labeled "Cover Story" in the middle of the page, because these two words will read as a small bump in the vector, not a true range of zeroes.

The correct regioning for the example described with respect to FIG. 20, should look like the illustration shown in FIG. 21, with four regions identified, rather than the two found by the columnizer. And for consideration, the much-more complicated full-page example from which the simpler example was pulled is shown in FIG. 22.

Figure 22:
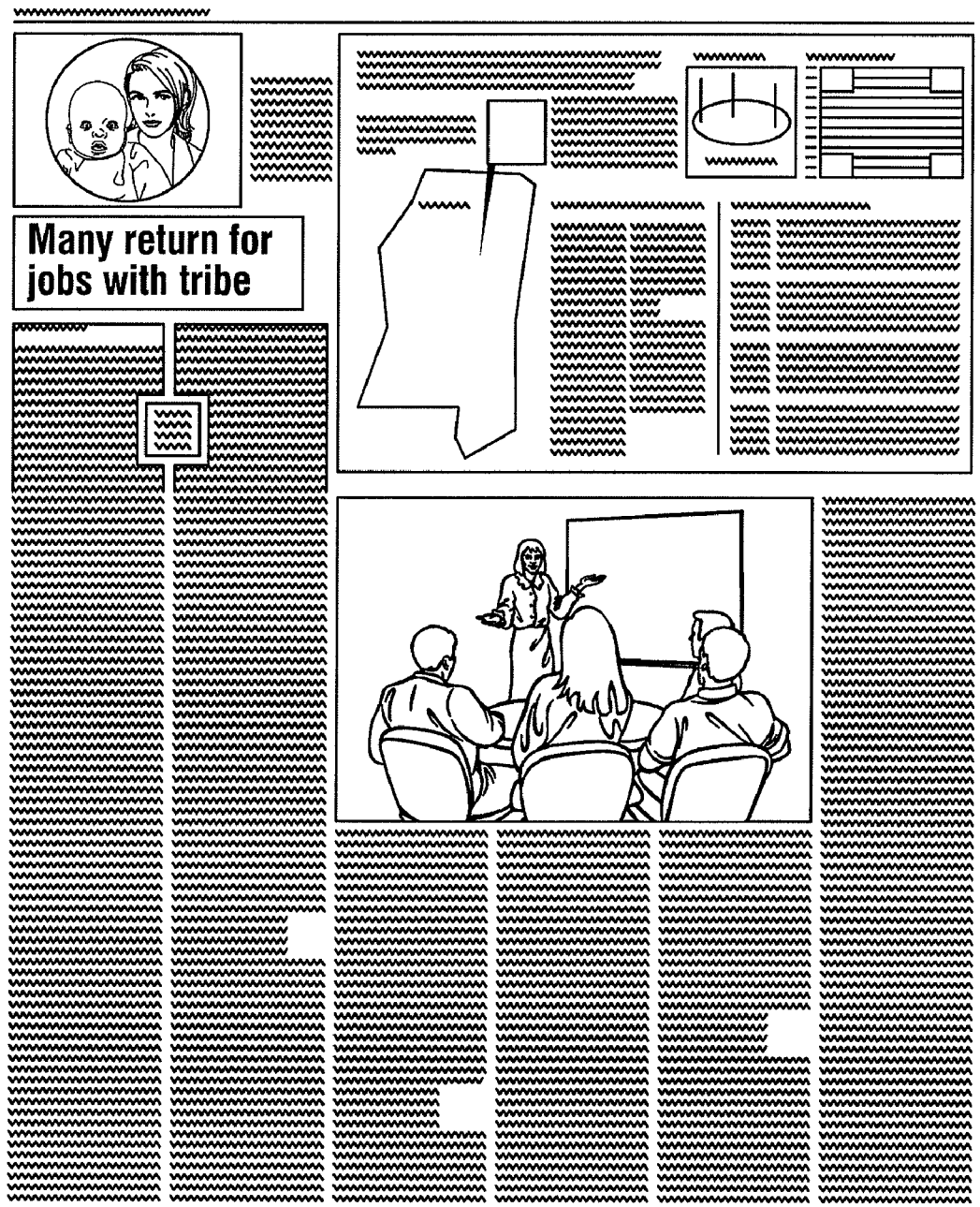
FIG. 22 illustrates a full page view of a page from which the example used in FIGS. 20 and 21.
Figure 23:
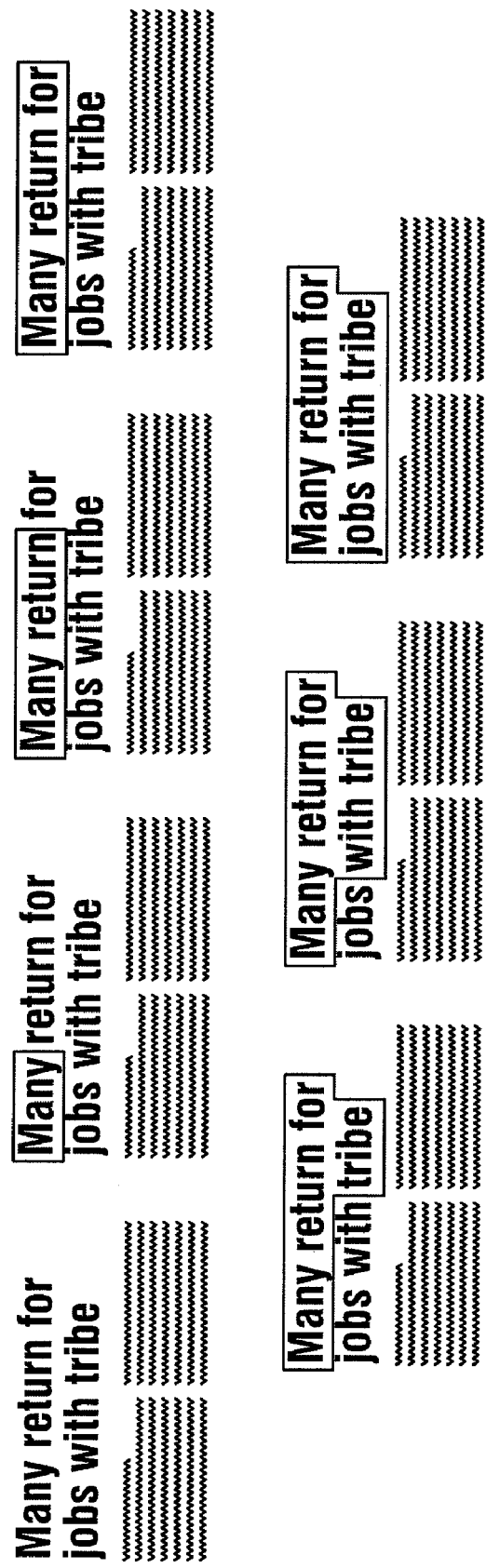
FIG. 23 is a series of views of a portion of the example page showing the operation of the buddySearch function.

Referring now to FIG. 23, the regions on a complex page as shown in FIG. 20-22 are identified using a different approach. Rather than looking for whitespace on the page, groups may be formed from areas having words of similar font size in close proximity, called herein as "buddies". By searching for words that have buddies with similar characteristics, the regions naturally identify themselves, regardless of complexity of shape or layout. This is performed by a function called buddySearch.

The operation of the buddySearch function, as illustrated in the upper left hand corner of FIG. 23, starts with the most upper-left handed word, "Many". This first word is selected to indicate that the word has been checked in a special data-structure that is used by the buddySeach process. Thereafter, the other words on the page are evaluated to determine if any is just to the right of selected word "Many", which is also of a similar height (which indicates the word is of a similar font size.) In this case, there is a word just to the right of "Many" which has these characteristics, the word "return". The information that "return" lies to the right of "Many" and that "Many" lies to the left of "return" is preserved in a data structure. The buddySearch process is then used recursively, starting on the word "return" this time.

In this iteration, the word to the right of "return" is processed and indicates that the word "for" has the desired properties. This information is preserved and then the buddySeach process is used again beginning with the word "for". The process indications that there is no word to the right of the word "for" which ahs the desired properties. The buddySeach process is used on the next line below and determines that the word "tribe" has the desired properties. This information is stored and the buddySearch process is begun again on the word "tribe".

Using buddySearch on the word "tribe", no word is found to the right or below having the desired properties. The process is then continued to the left and the word "with" is determined to have the desired properties. This information is stored and the buddySeach process is begun again on the word "with" which then reviews the word "jobs".

buddySearch analyzing the word "jobs" first checks to the left, but sees that the word "with" was already marked as found there and that the only words below are too small indicating that nothing to the left that has the desired properties. Finally the process checks above and finds that "Many" is there, but that "Many" has already been marked as being checked. Thereafter, the process is applied all the way back down the recursive tree, checking in remaining directions until all words in that block have been processed.

Once that has been completed, the process may move to the second word on the page, "return". The process would then determine that this word has already been processed and the process would the move on to the next and following words until it finds an unprocessed word. In FIG. 23, the next word it finds is the word "continued" on the line under the title line. In this operation, buddySearch will find the full line in the selected word is contained. Continuing down the list of all words on the page, the next region it founds starts with the word "7,000" and so on. Once the page has been traversed, although the coordinate boundaries of the regions on the pages have not specifically yet be determined, the process has identified a structure that indicates the appropriate number of regions which can be traversed to indicate which words fall in each.

The following text illustrates in psuedocode the simplicity of a recursive algorithm which may be used to provide the above described buddySearch process.

Main Loop

```
For each word on the page
    If the word has not been processed
        Call buddySearch on the word
    End
End
``` buddySearch

```
If the word has not been processed
Mark the word as processed
If the word has a buddy to the right
    Save that the words are buddies
    Call buddySearch on the buddy
If the word has a buddy below
    Save that the words are buddies
    Call buddySearch on the buddy
If the word has a buddy to the left
    Save that the words are buddies
    Call buddySearch on the buddy
If the word has a buddy above
    Save that the words are buddies
    Call buddySearch on the buddy
end
```

This approach identifies regions of text on complex pages. The regions can then be fed back to the Regionizer, which implements various strategies for ordering the regions found as described below with regard to FIGS. 24-26.

The operations of the processed described above may therefore be used to analyze text images of words to determine the appropriate word order for the words for use, for example, in a word processor or in other tasks which require the words to be in the natural order for interpretation by a human.

Figure 24A:
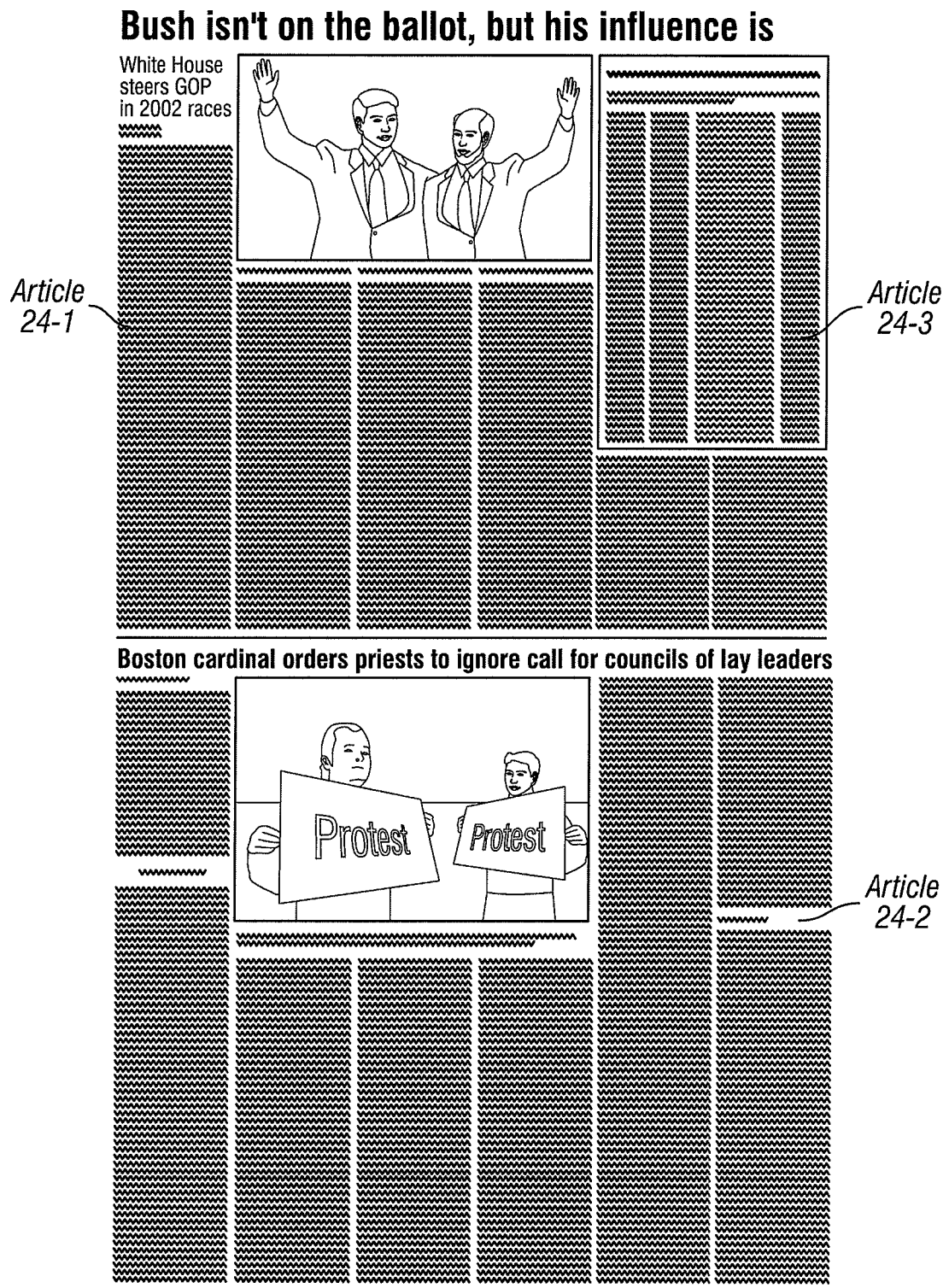
FIGS. 24a through 24d illustrate a full page view of a page of text, a first example of identification and ordering of regions of the page of text, an example of the frameset of the page of text developed by the frameset builder and an example of a preferred ordering of the regions in one of the articles shown in full page view of the text.
Figure 24B:
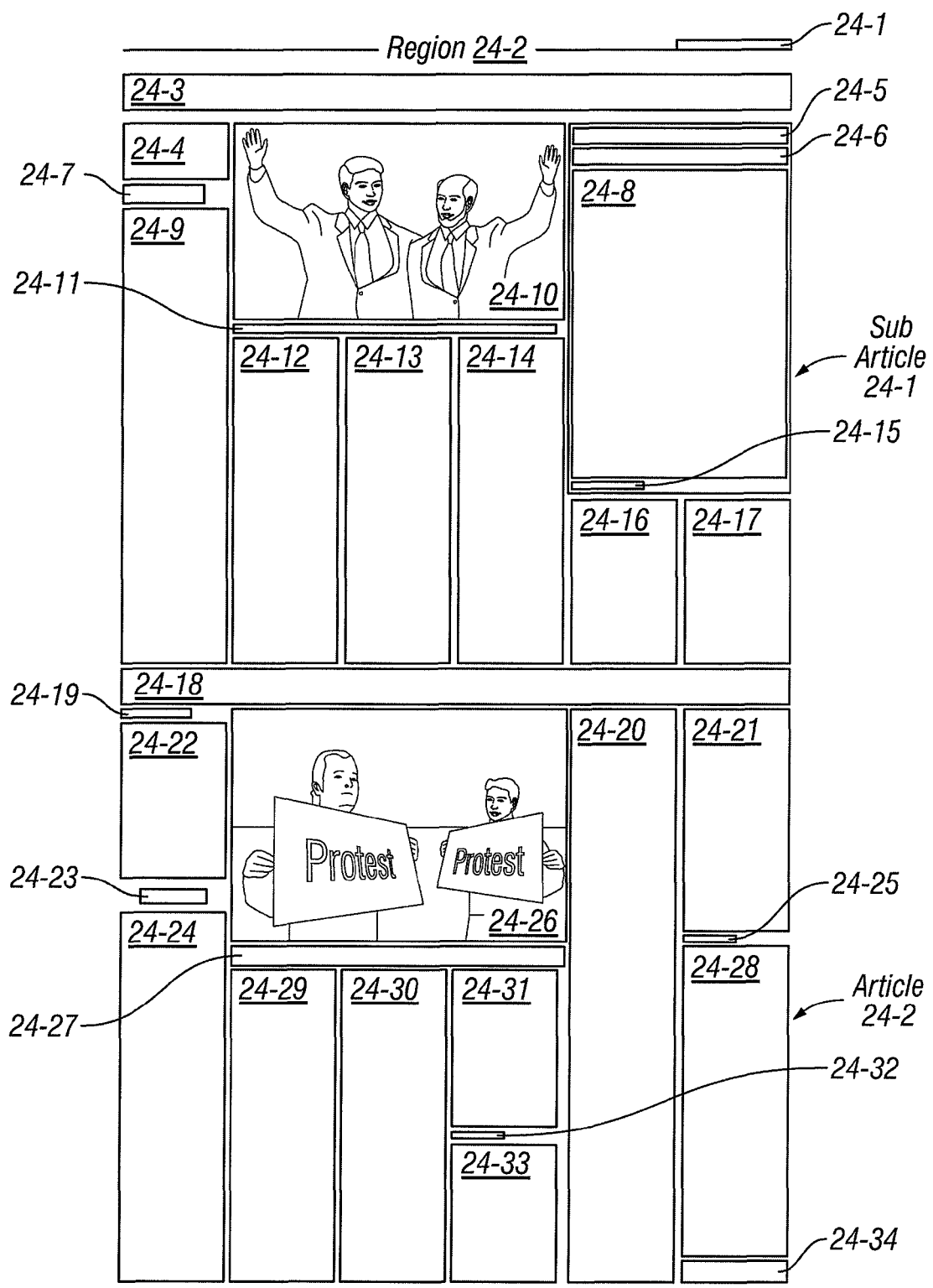
Figure 24C:
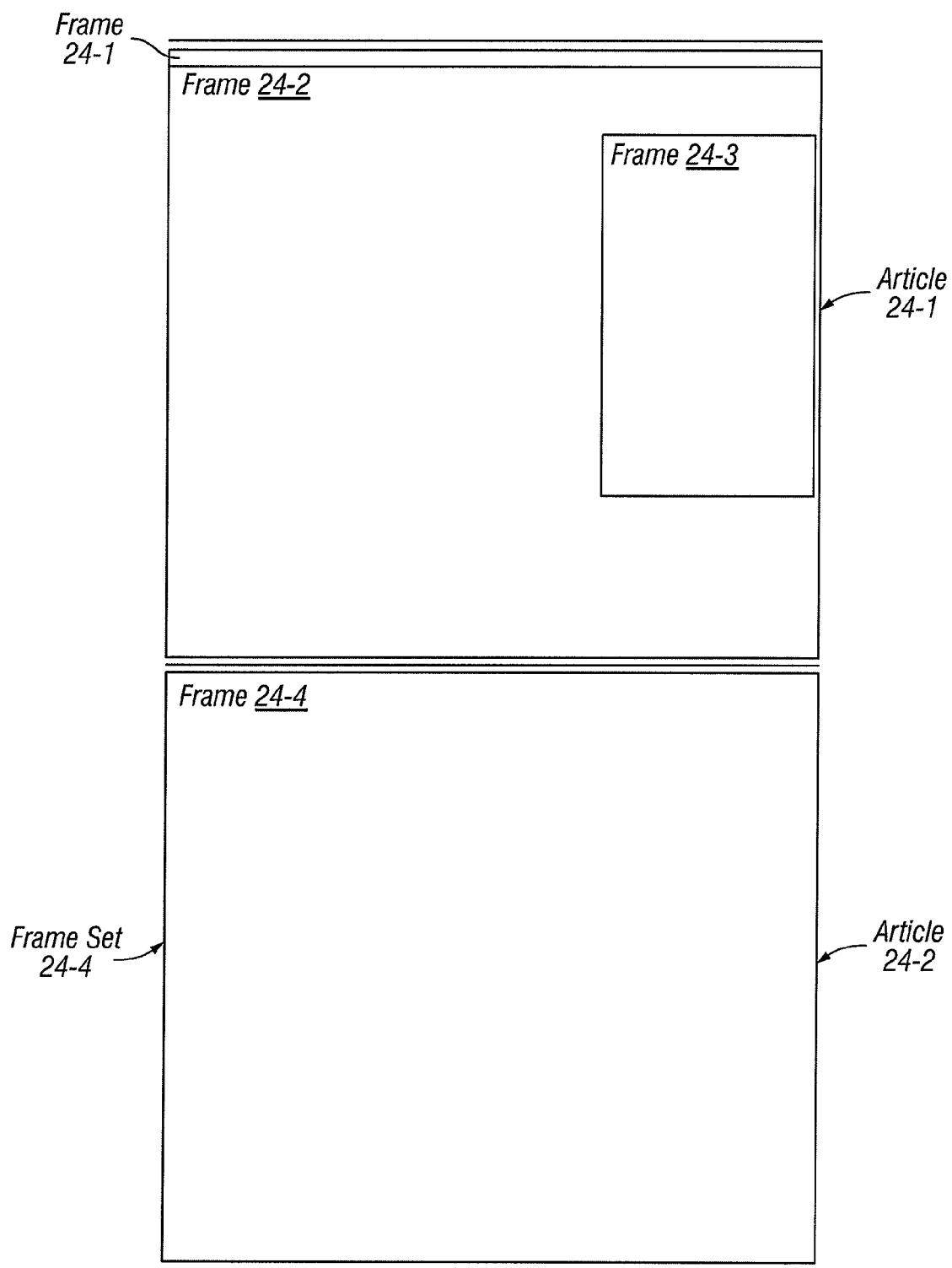
Figure 24D:
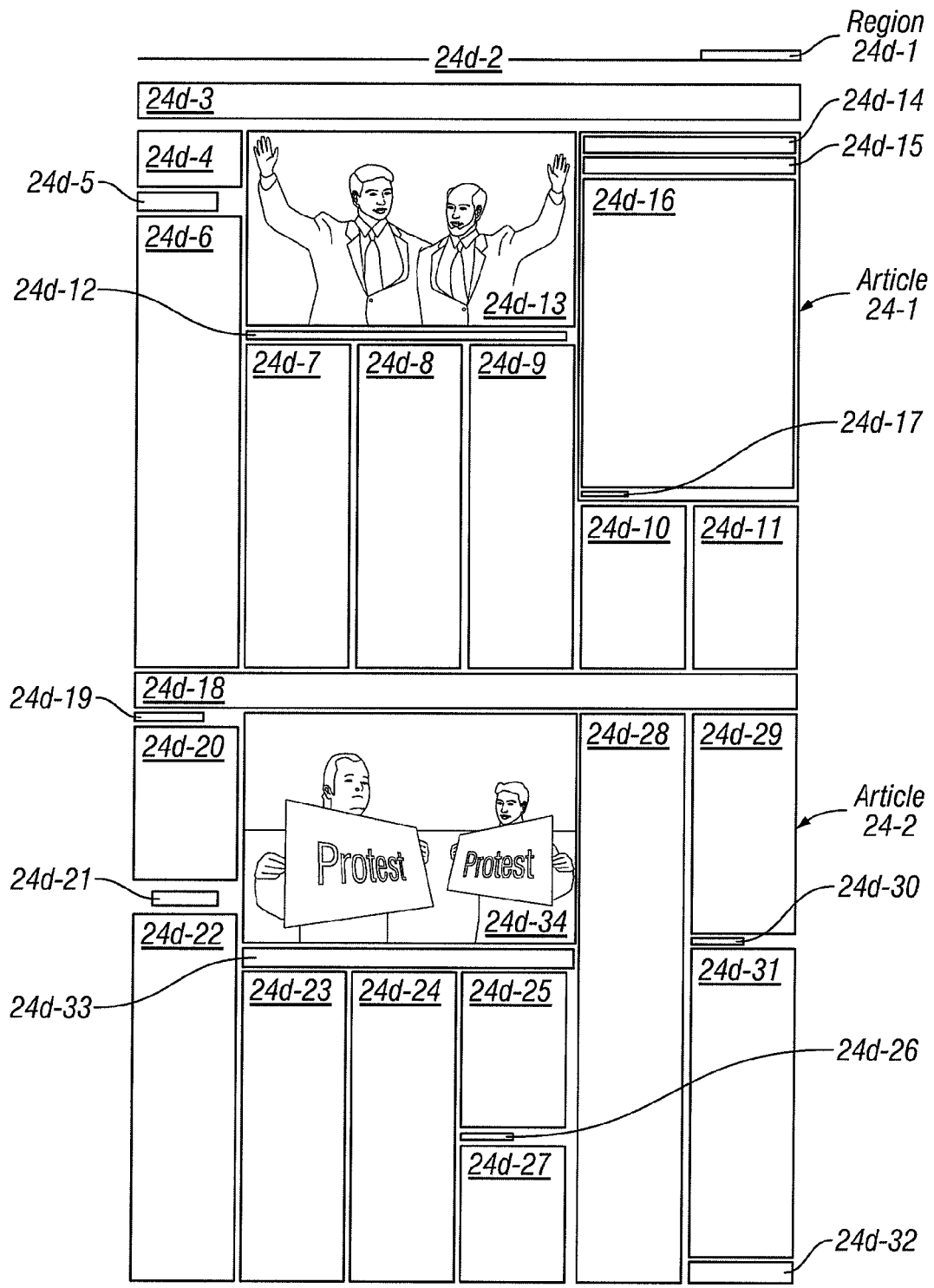

Referring now to FIGS. 24a-24d, an example of regions is presented which might be found on a complicated page of text, such as that found in a newspaper type journal. FIG. 24a depicts an original page of text while FIG. 24b depicts a simplified representation of the 34 regions that would be found by the buddySearch process discussed above. FIG. 24c shows one potentially desirable frameset for the page of text shown in FIG. 24a while FIG. 24d shows an example of an improved ordering of the regions, within the identified frameset, compared to the ordering of the regions shown in FIG. 24b.

Referring now in particular to FIG. 24b, in many cases, the ordering of the regions returned by the buddySearch process is different from the desired ordering. Specifically, the buddySearch returns regions in a left-to-right and top-to-bottom manner. While this ordering might work fine for a simple document such as a book or newsletter, for complex documents such as magazines or newspapers this would be unacceptable as in this more complicated case it is rare that the natural flow of the article take a left-to-right and top-to-bottom path, as the page in these cases generally have multiple articles interspersed with additional call-outs and sidebars. Additionally complicating the problem is the fact that from layout to layout, reader to reader, or application to application, the "correct" or desired or natural ordering of regions may diverge greatly. In more complex cases, there may be no "right" answer, only a "best determination" or "most-likely" solution, as in one case a reader might prefer to place all collateral information for an article at the end of the main text, while another might prefer it be interspersed as it occurs naturally on the page.

For example, when a human reads an article such as those shown on FIG. 24a, the most common pattern may be for the reader to first recognize the presence of multiple articles on the page, then within each article, first read the headline, followed by article content, and finally captions and call-outs. Specifically, referring now to FIG. 24b, a reader may first identify the two main articles, article 24-1 represented by regions 2-17 at the top of FIGS. 24a-d and article 24-2 represented by regions 18-34 at the bottom of FIGS. 24a-d. In FIG. 24b, the region numbers indicate the ordering of the regions in articles 24-1 and 24-2 that would be determined by a straight forward ordering of the regions from top to bottom and left to right as might be performed, for example, by buddySearch discussed above.

However, with regard to article 24-1, the natural flow for the ordering of the regions for the reader might be regions 2, 3, 4, 7, 12, 13, 14, 16, 17, 11, 5, 6, 8, and 15. An example of natural ordering for article 2 might be regions 18, 19, 22, 23, 29, 30, 31, 32, 33, 20, 21, 25, 28, 34, 26 and 27. Region 1, which includes the text "Washington", might stand alone as a separate page heading.

The problem of ordering the identified regions on a complicated page of text such as a newspaper or magazine page as shown in FIGS. 24a-d in a relatively natural order includes two primary two tasks: identifying articles for example in supersets of related textual content on the page; (e.g., articles 24-1 and 24-2) and properly ordering the regions (e.g. regions 2-17 in article 24-1 and regions 18-34 in article 24-2) within each superset or article. The first task is accomplished by software referred to herein as a "frameset builder" while the second, more difficult task, is accomplished by software referred to herein as an "article traces".

Referring now to FIG. 24c, for the purposes of ordering regions, a "frameset" such as frameset 24-4, refers to a set of meta-regions or "frames" on the page, such as frames 24-1, 24-2, 24-3 and 24-4, each of which include a set of related text or content. Frameset 24-3 contains frames 24-1 through 24-4 which encompass all regions on the page. As can be seen be inspection of FIG. 24c, frames and framesets are hierarchical in nature and can be nested. in that within frameset 24-4, frame 24-2 represents article 24-1 while frame 24-3 represents sub-article 24-3 included within article 24-1.

Referring now to FIG. 24d, an example of a desired ordering of regions 1-32 within the frameset 24-4 is shown. For example, a desirable or natural order of reading the regions of text in article 24-1 might be to first read the headings and titles in regions 1 and 2, then read the subheading and first full column of text in the left column, regions 3 to 6, followed by the text I the remaining columns, regions 7-11 and then return to the legend under the photograph, region 12, next look at the photograph, region 13 and then read sub-article 24-3, regions 14, 15 and 16, last reading the final line at the bottom of sub-article 24-3, region 17.

Referring again to FIG. 24c, depending on the specific application, various methods may be employed, either alone or in combination, to identify the desired framesets such as frames 1-4. These methods include using:

statistical analysis (e.g., identifying the relation between frames based on their text density, gray mass, font height or column width)

a repetitive logical algorithm (e.g., passing the regions through the Columnizer described above), or a buddySearch-type function (e.g. to identify relevant borders and relations);

external data provided by a human or non-human entity that interacts with the system (e.g., allowing a human user to manually specify the frameset, such as by "selecting" the frameset directly on a screen); and algorithmically interpolating the frame-set via interpretation of the placement of bounding lines and rectangles on the document page.

The method, or combination of methods, to apply to a given document type can be determined using an artificial intelligence or AI engine (including expert systems and/or genetic algorithm technology) that is trained to recognize the preferred combination for a given document type.

It is preferable to that the frameset builder, the article tracer and the Regionizer itself are each designed in a modular fashion that allow for the inclusion and execution of different approaches or methodologies for solving a particular problem set. It is also preferable that the frameset builder, the article tracer and the Regionizer are design to allow for the logical exclusion, or removal, of any approach or methodology for strategic reasons, without impacting the integrity of other aspects of the system.

Figure 25A:
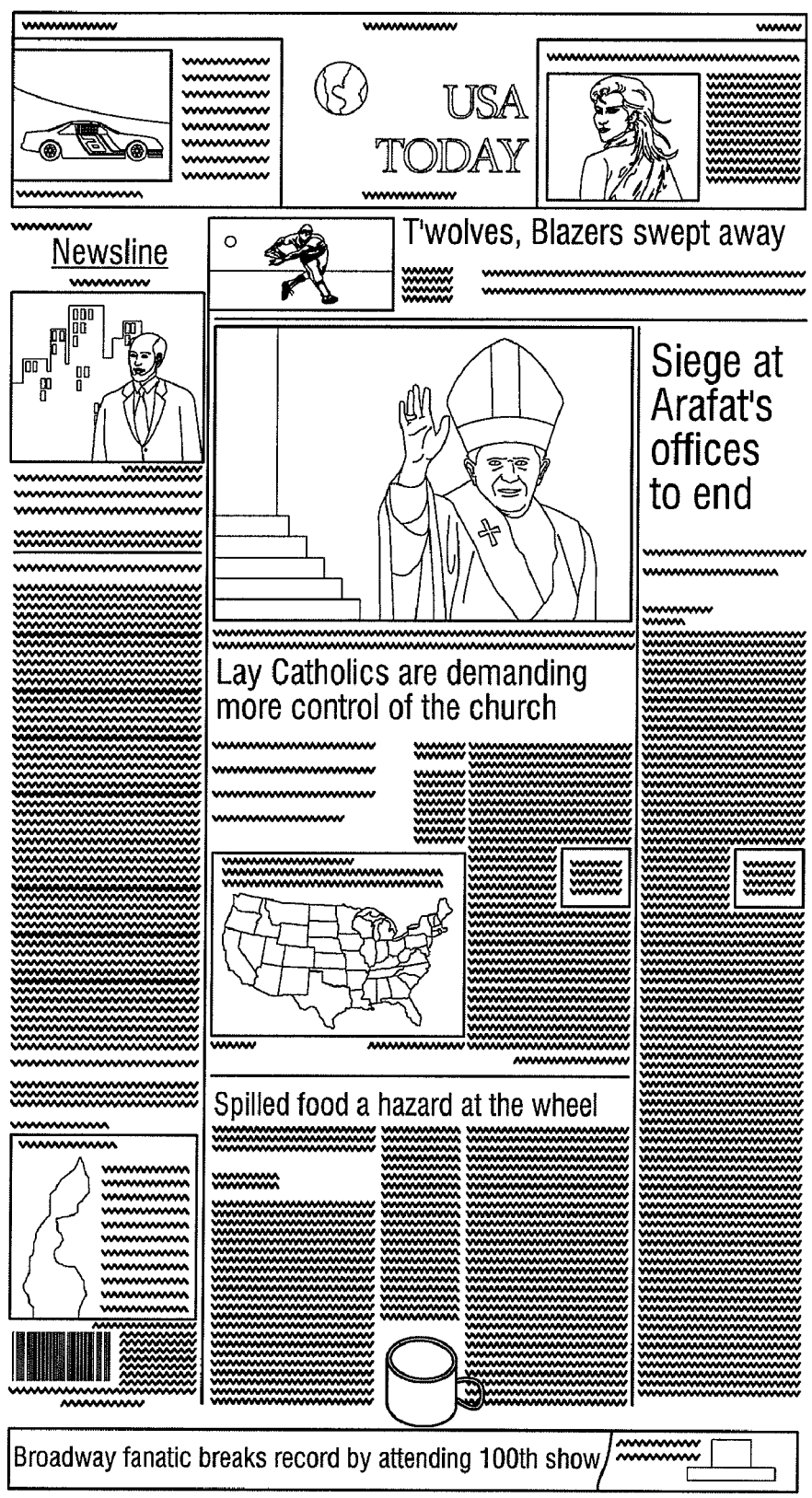
FIGS. 25a and 25b illustrate a full page view of another page of text and a frameset developed therefore by the frameset builder.
Figure 25B:
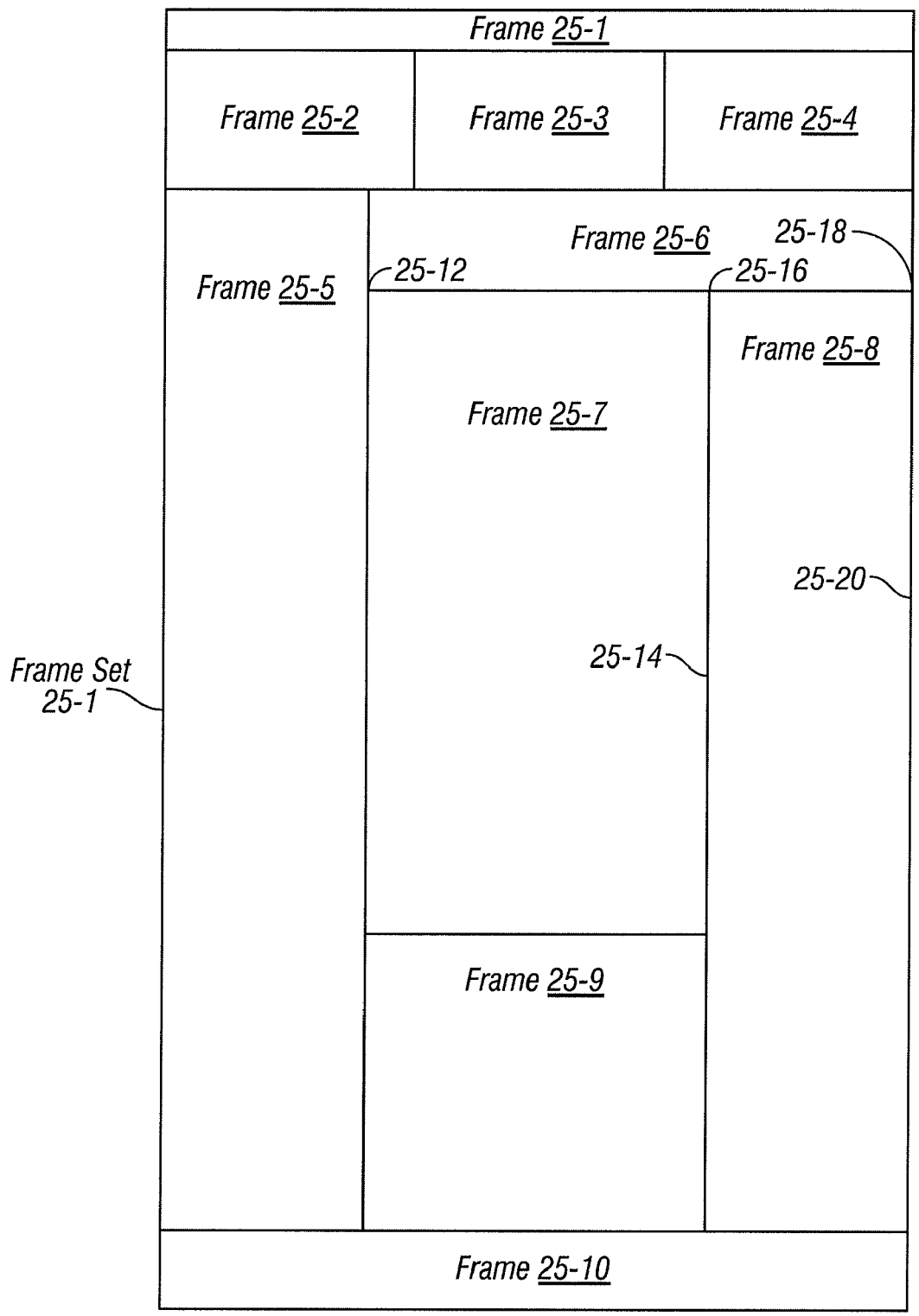

Referring now to FIGS. 25a and 25b, the frameset builder may be used to interpolate framesets by operating in a manner similar to the way the human eye and brain cooperate to recognize frames on a page. For example, upon quick visual inspection of the page, the human eye and brain cooperate to assess the content of FIG. 25a by establishes the logical breakdown of information shown in FIG. 25b. In particular, frameset 25-1 includes frames 25-1 through 25-10.

Frameset 25-1 is developed by extending each dividing line on the page outward "logically," until each dividing line either hits another dividing line or the edge of the page. If another line is hit, that line is then followed to its logical end—continuing the process until each line of the page has been traversed and the grid shown in FIG. 25b has been established.

A similar method is implemented in software to determine frameset 25-1 by first searching the page for rectangles and lines which have been drawn. The rectangles and line identified which will include frames 25-1 through 25-10 as well as other rectangles and lines, such as the rectangle surrounding the photograph within frame 25-5 and the various horizontal lines within frame 25-5 below that photograph. The software then checks the height and width ratios of the identified rectangles and lines to determine which of the rectangles and lines are true dividing lines. Using a mapping process similar to that disclosed above with regard to buddySearch, the software then logically "extends" the end of each line until another line or the edge of the page is reached and the intersection data is stored in a page-wide matrix. For example, line 25-12 between frames 25-6 and 25-7 would be extended to identify intersection 25-16 at the intersection with line 25-14. Line 25-12 would be further extended to detect intersection 25-18 at edge of paper 25-20.

Once all rectangle, line and intersection data for the page has been collected, the data is traced to establish the relationships between all lines and ultimately between the frames themselves to establish frameset 25-1 as shown in FIG. 25b. Once frameset 25-1 has been established, by means of the software method just described or by any other method, data representing frameset 25-1 including frames 25-1 through 25-10 stored in a data structure, such as the hierarchical data-structure used for storing frame data produced by the Columnizer function as described above.

Methods of identifying framesets, identifying a single frame within a frameset, ordering framesets, and ordering regions within framesets include, among others:

Graphical user interface (GUI).

Statistical analysis.

GUI preprocessing using fixed coordinates system analysis.

Neural net or genetic algorithm (e.g., using human input to attain an algorithm).

Statistical analysis based on article vocabulary.

Statistical analysis based on non-vocabulary article idiosyncrasies, e.g. fonts, writing styles, spacing, use of graphic symbols, etc.

Identification & utilization natural line boundaries on the page.

Using user entered lines and/or region data.

Simulated annealing.

Expert systems—using best rules developed for a particular category of original, such as a book or magazine.

Referring now again to FIGS. 24*a* and 24*b*, a graphically-based user interface or GUI integrated into a special version of the Client-side browser plugin (ebrary Reader) discussed above may be used which would permit the user to select the order of the regions by hand by clicking directly on the screen. In a preferred approach, a software implemented article tracer may use statistical analysis and brute-force analysis of similarities in regions to determine a best-guess ordering. Using article 24-1 shown in FIG. 24*a* as an example, the frameset builder would identify regions 24-2 through 24-17 to be in article 24-1 and that sub-frame 24-3 is positioned within article 24-1 and includes regions 24-5, 24-6, 24-8 and 24-15. Using the buddySearch function discussed above which, as shown, includes an inherent left-right, top-down ordering, the order of regions 24-2 through 24-15 may be as shown in accordance with FIG. 24*b*. This order of the regions may not be natural in that the region to follow regions 24-3 and 24-4 in the left most column of article 24-1 would be region 2-5 at the top of sub-article 24-3.

A better or more natural ordering of the regions in which the text in the columns in article 24-1 excluding the text in sub-article 24-3 is read first, followed by the text in the sub-article 24-3, may be achieved by the following process. Using a frameset builder analysis, statistical analysis of the word-rectangles in each region is used to determine for each such factors as average word-height, total word-mass, grey-density etc. Once these values are calculated, the text size of the main article content on the page is determined by averaging all the words which occur in all regions contained within the frame. The average column width for the main text portions of the article is determined by taking weighted-averages of the widths of all columns which employ text of that size. Each region may then be analyzed to determine if it is a headline, which appear as font sizes which are significantly above the statistical norm, but with relatively low word counts, a call-out, which appear as near normal or smaller font regions with low word counts but statistical anomalous column widths, or article text, which have both font sizes in the normal range, widths near the mean and generally statistically high word-counts, mass and grey-mass levels. The regions may then be processed in the order returned from buddySearch checking to see if each region fits in the frame, but not inside any sub-frames; is a call-out or article text, or is as a headline.

Figure 26:
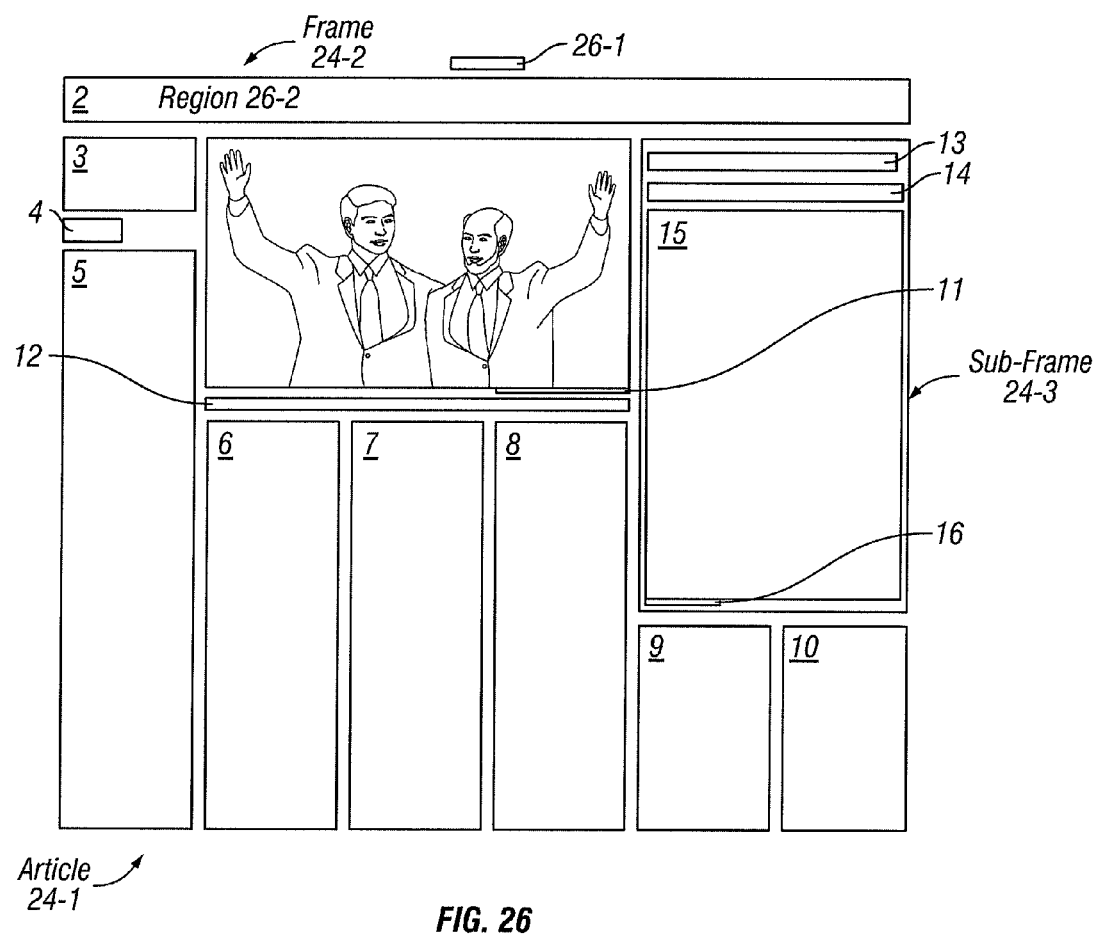
FIG. 26 illustrates a preferred ordering of the regions of the page of text shown in FIG. 24b developed by the article tracer.

Referring now to FIGS. 24*b* and 26, this analysis when applied to article 24-1 yields the following results:

region 24-2 has a font size twice normal is therefore not article text, but the font size is not large enough to be a headline. Thus, it is likely to be a page title or caption, and it is copied over into the new ordering as region 26-1 and marked as having been processed.

region 24-3 is then identified as a headline due to its large font-size and low grey-mass, and may therefore be designated as region 26-2 and used an anchor point for frame 24-2 of article 24-1.

The article tracer process may then be applied to frame 24-2 which returns a listing of all regions in the order in which they would appear in that frame, that is:

region 24-4 is marked as processed and becomes region 26-3, region 24-7 is marked as processed and becomes region 26-4, region 24-9 is marked as processed and becomes region 26-5, region 24-12 is marked as processed and becomes region 26-6, region 24-13 is marked as processed and becomes region 26-7, region 24-14 is marked as processed and becomes region 26-8, region 24-16 is marked as processed and becomes region 26-9, region 24-17 is marked as processed and becomes region 26-10.

Thereafter the regions are continued to be processed in the order as determined in FIG. 24*b* except that regions already processed by the article tracer are not reprocessed. That is:

region 24-3 is identified as having been processed by the article tracer, and is skipped.

region 24-4 is identified as having been processed by the article tracer, and is skipped.

regions 24-5 and 24-6 are determined to fit entirely within sub-frame 24-3 within the frame, and are skipped.

region 24-7 has already been processed and is skipped.

region 24-8 is determined to fit entirely within sub-frame 24-3 within the frame, and is skipped.

region 24-9 has already been processed and is skipped.

region 24-10 is determined to be a call-out, is marked as processed and becomes region 26-11.

region 24-11, is determined to be a call-out, is marked as processed and becomes region 26-12.

regions 24-12, 24-13, 24-14, 24-16 and 24-17 have already been processed and are skipped.

At the end of this first pass, the first 12 regions on the page have been ordered, with only the regions appearing in sub-frame 24-3 remain to be processed. The article tracer process is then applied recursively to sub-frame 24-3 which returns a listing of all regions in the order in which they would appear in that sub-frame, that is:

region 24-5 is marked as processed and becomes region 26-13, region 24-6 is marked as processed and becomes region 26-14, region 24-8 is marked as processed and becomes region 26-15, and region 24-15 is determined to be a callout, is marked as processed and becomes region 26-16.

The regions shown in FIG. 26, regions 26-1 through 26-16 are in a natural or desirable order.

The Article Tracer is a modular algorithm for determining the ordering of regions within an article. As with other aspects of this system, varying methods including those described above can be used to make the determination, depending on relevant factors such as the page and type of layout utilized. In one example the algorithm uses a brute-force approach for ordering. Starting with the identified headline, moves downward, using a buddySearch type mapping algorithm, finding regions which are below the headline region which still fit in the frame, and share the same left edge.

Referring again to FIG. 24b, this approach identifies and marks regions 24-3, 24-4, 24-7 and 24-9. Then, the procedure moves over the left most column established by the previous statistical analysis of all regions on the page, and includes regions which fit into that column or to the left of it. This finds region 24-10, but skips region 24-11 because region 24-11 spans several columns. Repeating this approach as long as there are regions that share the bottom-edge of the bottom of the lowest region found in the first column, i.e. region 24-9, the procedure will identify and mark regions 24-12, 24-13 and 24-14. Region 24-10 will be skipped because the font size is determined to be significantly smaller than the average size text. The procedure will then identify and mark regions 24-16 and 24-17, skipping regions 24-5, 6, 8 & 15 because they are in a sub-frame, sub frame 24-3. The procedure may then be applied to the regions in sub-frame 24-3, identifying and marking regions 24-5, 6, 8 and marking region 24-15 as a callout.

Preferred methods of using article tracer to determine the ordering of regions within articles include:

Identifying graphic characteristics such as font height, text density and grey mass to identify headlines, banners, or the like Comparing the graphic characteristic(s) to the characteristic(s) of other regions, such as those below or next to the region in question Comparing sub-regions in a logically-ordered progression, such as top-to-bottom/left-to-right One useful trick in analyzing the relation of regions, columns, or the like to one another is to define the regions/columns to be slightly larger than the text or other content, so that regions/columns overlap slightly. This approach may be utilized in the article tracer to find a natural flow across multi-columned articles. The buddySearch approach can be applied repeatedly to successively larger or smaller sets of content. For example, it can be used to identify a region, a column, a frame, or a frameset.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. An apparatus for providing a secure transfer of a high-resolution image, used for non-viewing purposes, over a network from a server to a client, comprising:
   said server comprising means for creating a high-resolution image of an original document for non-viewing purposes wherein said high-resolution image has higher resolution than a low-resolution image;
   a data repository for storing said high-resolution image;
   said server comprising means for creating said low-resolution image of the original document for viewing purposes wherein said low-resolution image contains all data present in said high-resolution image;
   said data repository storing said low-resolution image;
   said server comprising means for transferring from said data repository to said client at least a portion of said low-resolution image in response to a first user action;
   said server comprising means for mapping the location of words or objects on each page of the original document to said low-resolution image to determine a mapping template related to discreet portions of said low-resolution image, wherein said discreet portions are user-selectable and correspond to both the original document and said high-resolution image;
   said server comprising means for determining from said mapping template corresponding words or objects in said high-resolution image in response to a second user action, which comprises selecting one or more of said discreet portions of said low-resolution image by establishing the bounds of a box of pixels on said low-resolution image; and
   said server comprising means for transferring said corresponding words or objects of said high-resolution image to said client.

2. The apparatus of claim 1, wherein said selected portions include words, said server further comprising:
   means for determining a preferred order of said words in said selected portions.

3. The apparatus of claim 2, wherein said means for transferring further comprises:
   means for transferring words in said selected portions in said preferred order.

4. The apparatus of claim 3, wherein said preferred order is a preferred order for interpretation by a human.

5. The apparatus of claim 2, wherein said means for determining a preferred order comprises:
   means for one or more of columnizing and regionizing.

6. The apparatus of claim 5, wherein said means for determining a preferred order further comprises:
   means for performing a normalizing function.

7. The apparatus of claim 1, said means for transferring further comprising:
   means for transferring said selected portion to said client only if said client meets one or more authorization requirements.

8. An apparatus for providing a secure transfer of a page of a document, in the form of a high-resolution image, over a network from a server to a client, comprising:
   means associated with said server for creating a high-resolution image of the original document page;
   means associated with said server for creating a low-resolution image of the original document page for presentation to a user wherein said low-resolution image contains all data comprising at least any of the following: words, graphics, content, metadata, structures, or other elements present in said high-resolution image;
   means associated with said server for creating a mapping template of the location of words or objects on each page of the original document that assigns a unique identifier to each discreet portion of said low-resolution image;
   means associated with said server for establishing the location of each such word or object by defining the bounds of a box of pixels in the original document that includes the word or object, and that is represented in a corresponding discreet portion of said low-resolution image to create user-selectable portions of said low-resolution image;

said server comprising means for transferring said low-resolution image of the original document page and its mapping template to the client in response to a first user action;

said client comprising means for using the mapping template to identify portion of said low-resolution image the user has selected in response to a further user action;

said client comprising means for transferring to the server information identifying the selected-portion according to the mapping template;

means associated with said server for using the mapping information to determine which words, graphics, content, metadata, structures, or other elements of the original document page correspond to the selected portion of said low-resolution image; and said server comprising means for transferring to the client the corresponding selected words, graphics, content, metadata, structures, or other elements of the original document in the form of said high-resolution image.

* * * * *